(12) United States Patent  (10) Patent No.: US 8,508,288 B2
MacFarlane  (45) Date of Patent: Aug. 13, 2013

(54) CHARGE PUMP CIRCUIT AND METHODS OF OPERATION THEREOF

(75) Inventor: Douglas James Wallace MacFarlane, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 0 days.

(21) Appl. No.: 13/603,222

(22) Filed: Sep. 4, 2012

(65) Prior Publication Data
US 2012/0326771 A1  Dec. 27, 2012

Related U.S. Application Data

(63) Continuation of application No. 12/744,073, filed as application No. PCT/GB2008/004043 on Dec. 8, 2008, now Pat. No. 8,264,273.

(30) Foreign Application Priority Data

Dec. 11, 2007  (GB) .................................... 0724166.4

(51) Int. Cl.
*G05F 1/10* (2006.01)

(52) U.S. Cl.
USPC ............................................. 327/536; 363/60

(58) Field of Classification Search
USPC ...................................... 327/536; 363/59–60
See application file for complete search history.

(56) References Cited

U.S. PATENT DOCUMENTS

| | | | | |
|---|---|---|---|---|
| 5,306,954 A | * | 4/1994 | Chan et al. | 307/110 |
| 5,339,236 A | * | 8/1994 | Tamagawa | 363/59 |
| 5,668,710 A | * | 9/1997 | Caliboso et al. | 363/60 |
| 5,734,291 A | * | 3/1998 | Tasdighi et al. | 327/537 |
| 6,226,193 B1 | | 5/2001 | Bayer et al. | |
| 6,445,623 B1 | | 9/2002 | Zhang et al. | |
| 6,483,282 B1 | * | 11/2002 | Bayer | 323/315 |
| 6,504,422 B1 | | 1/2003 | Rader et al. | |
| 6,512,411 B2 | | 1/2003 | Meng et al. | |
| 6,636,103 B2 | * | 10/2003 | Wurcer et al. | 327/536 |
| 6,657,875 B1 | | 12/2003 | Zeng et al. | |
| 6,794,926 B2 | | 9/2004 | Rader et al. | |
| 7,250,810 B1 | | 7/2007 | Tsen | |
| 7,622,984 B2 | | 11/2009 | Lesso et al. | |
| 7,626,445 B2 | | 12/2009 | Lesso et al. | |
| 7,663,429 B2 | * | 2/2010 | Wang | 327/536 |
| 7,714,660 B2 | | 5/2010 | Lesso et al. | |
| 8,264,273 B2 | * | 9/2012 | Macfarlane | 327/536 |

(Continued)

FOREIGN PATENT DOCUMENTS

| | | |
|---|---|---|
| EP | 1 139 551 A2 | 10/2001 |
| EP | 1 753 117 A2 | 2/2007 |
| EP | 1 895 646 A1 | 3/2008 |
| WO | WO 2006/043479 A1 | 4/2006 |

*Primary Examiner* — Thomas J Hiltunen

(74) *Attorney, Agent, or Firm* — Dickstein Shapiro LLP

(57) ABSTRACT

A method of generating a voltage supply (Vout+, Vout−) from a single input supply (+$V_{DD}$), comprising connecting at least one flying capacitor (Cf) to at least one reservoir capacitor (CR1, CR2) and to the input supply in repeated cycles so as to generate a voltage on said reservoir capacitor, the cycles differing between at least two modes so that each mode generates a different voltage on said reservoir capacitor the method including changing from an existing one of said modes to enter a new one of said modes during operation, and operating in at least one transitional mode for a period prior to entering fully said new mode.

33 Claims, 14 Drawing Sheets

(56) References Cited

U.S. PATENT DOCUMENTS

| | | | |
|---|---|---|---|
| 8,289,071 B2 * | 10/2012 | Miyazaki et al. | 327/536 |
| 2005/0072987 A1 | 4/2005 | Robb et al. | |
| 2005/0219878 A1 | 10/2005 | Ito et al. | |
| 2007/0176671 A1 * | 8/2007 | Ishida | 327/536 |
| 2007/0205823 A1 | 9/2007 | Cho | |
| 2007/0211502 A1 | 9/2007 | Komiya | |
| 2007/0279950 A1 * | 12/2007 | Sugiyama et al. | 363/59 |
| 2008/0044041 A1 * | 2/2008 | Tucker et al. | 381/120 |
| 2008/0084239 A1 | 4/2008 | Oswald et al. | |
| 2008/0144861 A1 | 6/2008 | Melanson et al. | |

* cited by examiner

CHARGE PUMP CIRCUIT AND METHODS OF OPERATION THEREOF

This is a continuation of application Ser. No. 12/744,073, filed Jul. 12, 2010, now U.S. Pat. No. 8,264,273, which is a 371 of International Patent Application No. PCT/GB2008/004043, filed Dec. 8, 2008, which claims priority to GB 0724166.4, filed Dec. 11, 2007, the specifications of which are each herein incorporated by reference in their entirety.

The present invention relates to charge pump circuits and in particular charge pump circuits which have different modes of operation.

Charge pump circuits are known in the art. These circuits are a type of DC-DC converter which use capacitors as energy storage and transfer devices and are able to provide a power source at one or more higher or lower voltages than that obtained from one or more the available input voltage sources. Charge pump circuits are capable of high efficiencies, sometimes as high as 90-95%.

Charge pumps use some form of switching device(s) to control the connection of the capacitors to voltage sources and to one another, to typically obtain voltages other than the input voltage value. The charge pump includes a capacitor, typically known as a "flying capacitor", for transferring charge to one or more output capacitors, which will be referred to as "reservoir capacitors". Such charge pumps can be used to generate dual rail, that is bipolar, supply voltages from a single rail input voltage VDD. A drawback with known dual rail charge pumps is that they may, for example, produce an output voltage having a magnitude twice the input voltage (VDD), that is, one rail is at a voltage VDD, the other at a voltage −VDD, with reference to a common terminal. This can be very inefficient if such a charge pump is used, for example, to power circuitry that amplifies a signal that has a maximum amplitude much smaller than the amplifier circuitry's power supply +/−VDD. In such a case most of the output power (and therefore input power) is wasted in producing heat as opposed to driving the signal. However, of course, it is sometimes advantageous to be able to select this full output range when desired.

Our earlier patent application GB0625954.3 [ref DMCP], not published at the present priority date, describes a dual mode charge pump (MCP) in which positive and negative voltages equal to a fraction (for example one half or +/−VDD/2) of the output voltage can be generated in first mode, while full +/−VDD can be generated in another mode. The inventors have recognised that unusual current flow patterns around the transitions between modes can sometimes impose design constraints on the apparatus, and have therefore devised measures to manage the transitions and so relax these design constraints. These considerations may be applied in other types of multi-mode charge pump besides the one described in our prior application.

The invention provides a method of generating a voltage supply from a single input supply, comprising connecting at least one flying capacitor to at least one reservoir capacitor and to the input supply in repeated cycles so as to generate a voltage on said reservoir capacitor, the cycles differing between at least two modes so that each mode generates a different voltage on said reservoir capacitor the method including changing from an existing one of said modes to enter a new one of said modes during operation, and operating in at least one transitional mode for a period prior to entering fully said new mode.

In one embodiment, said transitional mode comprises cycles in which the connection of the flying capacitor to said voltage supply is restricted compared with the mode being entered.

For a transition between modes in which the voltage on said reservoir capacitor is higher in the mode being entered than in the existing mode the method may comprise connecting a current restricting element between the flying capacitor and the voltage supply during said transitional mode. Restricting the current in this way avoids drawing large currents from the input supply when changing from a low output voltage to a high output voltage. This in turn permits a smaller decoupling capacitor to be used at the input supply side of the charge pump.

In a preferred embodiment of this type, the current restricting element comprises a constant current source. The constant current source may comprise a switch device which is controlled to limit current in said transitional mode and not to limit current in the mode being entered. The current restricting element may be connected between one of said flying capacitor terminals and terminal common to said reservoir capacitor and said voltage supply.

The transitional mode in the preferred embodiment is implemented for a predetermined time interval.

In an embodiment where the voltage on the reservoir capacitor in the mode being entered is lower than in the existing mode the operation in said transitional mode may be performed so as to prevent transfer of charge from the reservoir capacitor to the voltage supply. This transitional mode addresses the problem in which charge is pumped back into the supply. These two types of transition may of course arise at different times in the same apparatus.

In said transitional mode when the voltage on the reservoir capacitor in the mode being entered is lower than in the existing mode the operation may be modified to prevent connection of the flying capacitor across the voltage supply.

In one embodiment at least two reservoir capacitors are used to carry respective output voltages of nominally equal magnitude and, when operating during said transitional mode, connecting said flying capacitor to said two reservoir capacitors alternately so as to maintain equality while their voltages reduce to the level of the mode being entered.

The transition mode may include monitoring the voltage on said reservoir capacitor as it falls from its existing level toward the lower level of the mode being entered and terminating the transitional mode automatically when a reference level is reached.

In a preferred embodiment, operation in the mode being entered comprises repeating cycles of three phases, and operation in the mode being entered in differs from operation in the transition mode in only one of said phases. This simplifies implementation and may reduce variations in the EMC spectrum of the device.

In a preferred embodiment using the invention of our earlier application (ref LSCP) mentioned above, the voltages in said reservoir capacitors in the mode being entered are each substantially half the voltage of the input supply and are generated using a single flying capacitor.

The method may further comprise powering an amplifier circuit using said the voltage(s) generated on said reservoir capacitor(s) and connecting a signal output to a load, and further altering the range of signals generated at the signal output in response to an output level demand signal, by selecting either a first mode or the second mode of operation. In one example the method is operated in said first mode when said amplifier circuit is driving a headphone and operating the charge pump circuit in said second mode when said amplifier circuit is driving a line input.

The invention further provides a charge pump circuit having terminals adapted for connection to at least one reservoir, capacitor and at least one flying capacitor and being operable in at least two modes to connect said flying capacitor in repeated cycles to said reservoir capacitor and to a voltage supply so as to generate a voltage on said reservoir capacitor, the cycles differing between the modes so that each mode generates a different voltage on said reservoir capacitor, the circuit being operable to change from an existing one of said modes to enter a new one of said modes during operation, and to operate in a further, transitional mode for a period prior to entering fully the new mode.

Optional features of the circuit can be provided as set forth in the dependent claims, for example to implement the preferred embodiments of the method as set forth above.

The invention further provides a portable electronic apparatus including a charge pump circuit according to the invention as set forth above, the charge pump having a flying capacitor connected to said flying capacitor terminals and at least one reservoir capacitor connected between a first output terminal and a common terminal, the apparatus further comprising functional circuitry connected to be powered by the voltage on the reservoir capacitor.

The portable apparatus, typically battery-powered may be an audio or video player, a communication device such as a telephone handset, or any manner of device. The functional circuitry may be audio output circuitry. In one embodiment said audio output circuitry includes a single output stage operable to directly drive an audio transducer in a first arrangement and a line input of an external amplifying apparatus in a second arrangement such that an output signal to be provided to said line input in the second arrangement has a higher voltage amplitude for a given signal content than an output signal driving said audio output transducer in said first arrangement, wherein said charge pump circuit is arranged to change modes in response to connection in said first and second arrangements, thereby to supply said single output stage with a lower supply voltage in said first arrangement than in said second arrangement.

Further optional features of the invention are as disclosed in the appended claims and in the description which follows.

The invention in a further aspect provides for application of one or both of the transitional modes described above in a closed-loop regulated charge pump, whether or not the modes are also used for transition between different modes.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Background

Charge pump circuits are known in the art for generating supply voltages within electronic circuits, particularly within integrated circuits, by transferring packets of charge between different capacitors using a network of switches. The output voltages are set by accumulation of charge on output or "reservoir" capacitors. Charge packets are transferred to the reservoir capacitors via one or more "flying" (sometimes "flyback") capacitors. A particular advantage of charge pump circuits is that the generated voltages may be outside the range of the received supply voltage. Thus, for example, a so-called inverting charge pump allows generation of bipolar supplies of +/−3 volts to be generated from a single 3V battery supply. A supply of 6V may be generated.

In some applications, it is desirable for the charge pump to operate from time to time in different modes, generating different output voltages according to need. Thus, charge pump circuits are known in which voltages can be generated which are equal, two times or three times or even a fraction of the input voltage, according to the state of a mode selection signal.

Dual Mode Charge Puma Example

Figure 1:
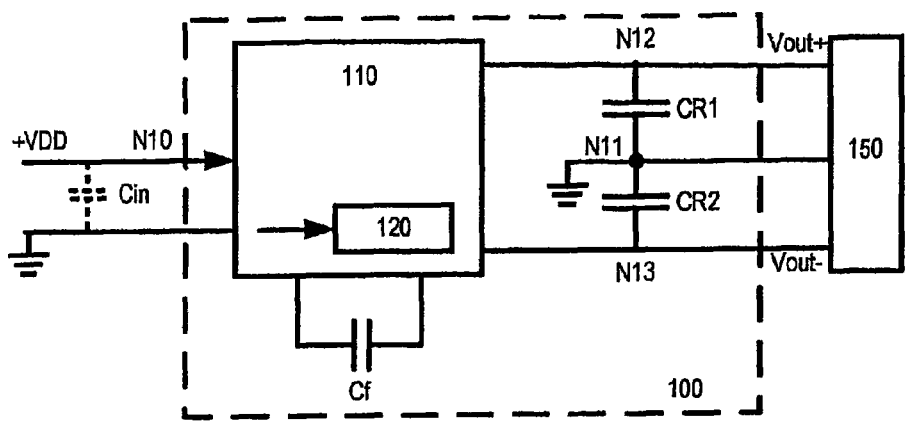
FIG. 1 shows a Dual Mode Charge Pump circuit according to an embodiment of the invention.

FIG. 1 illustrates a novel dual mode charge-pump (DMCP) circuit 100 which comprises three capacitors, one flying capacitor Cf and two reservoir capacitors CR1, CR2, and a switch array 110. Circuit 100 is controlled by a controller 120 which controls the switch array 110 thus causing circuit 100 to switch between various states to implement the different modes of operation, as explained below. Clock signals (not shown) are provided to the controller, which may be generated within DMCP 100 or shared with other circuitry on chip. The circuit 100 in operation uses flying capacitor Cf to transfer packets of charge from an input supply to the reservoir capacitors at relatively high frequency, in such a way as to generate positive and negative output voltages (Vout+& Vout−) from a positive input voltage (+VDD). The values of these output voltages depend on the mode selected. To aid explanation, various circuit nodes N10-N15 are labelled, including node N10 connected to receive the input supply voltage VDD, node N11 being a common (ground) node and nodes N12 and N13 forming the output terminals for Vout+ and Vout− respectively. Input supply voltage VDD will generally be drawn from a decoupling capacitor shown dotted as Cin, though this is not essential and not part of the charge pump circuit itself.

Connected to the outputs Vout+, Vout−, and N11 (0V) is a load 150. In reality this load 150 may be wholly or partly located on the same chip as the power supply, or alternatively it may be located off-chip. Example applications will be described with reference to FIGS. 23 to 25 below.

As its name implies, DMCP 100 is operable in two main modes. As mentioned in the introduction, additional modes are provided to ease transition between the main modes. All of these modes will be explained in more detail below. Naturally the principles of the dual mode circuit can be extended to multiple modes.

In the first main mode, referred to below as Mode 1, the DMCP 100 operates such that, for an input voltage +VDD, the DMCP 400 generates outputs each of a magnitude which is a half of the input voltage VDD. In other words, the output voltages generated in this first mode are nominally of magnitude +VDD/2 and −VDD/2. When loaded, these levels will, in reality, be +/−(VDD/2−Iload.Rload), where Iload equals the load current and Rload equals the load resistance. It should be noted that, in this case, the magnitude (VDD) of output voltage across nodes N12 & N13 is the same, or is substantially the same, as that of the input voltage (VDD) across nodes N10 & N11, but shifted. This mode may therefore be referred to as a 'level shifting' mode. In the second main mode (Mode 2) the DMCP 100 produces a dual rail output of +/−VDD.

Figure 2:
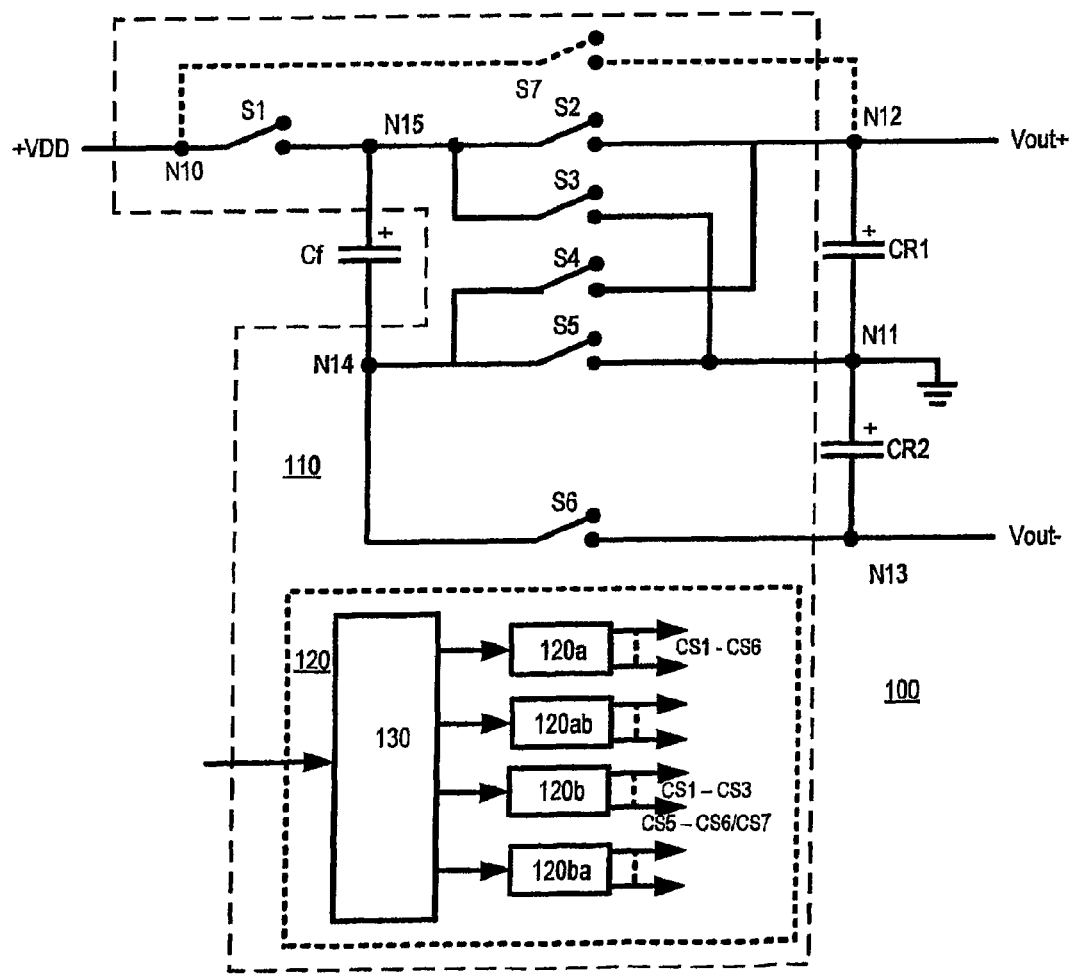
FIG. 2 shows the same circuit as FIG. 1 with internal detail of the charge pump switch array and control module.

The DMCP of FIGS. 1 and 2 in this example follows the teaching of our earlier patent applications GB0625957.6 [ref LSCP] and GB0625954.3 [ref DMCP], not published at the present priority date. This particular form of charge pump has significant advantages over known circuits, in particular because of the ability to generated a reduced, bipolar supply using only a single flying capacitor. Prior circuits for generating reduced output voltages requires additional flying capacitors. The flying capacitor and reservoir capacitors are often of a size that they need to be located off-chip, and so eliminating one capacitor and two IC pins is highly beneficial. The present invention not to be taken as being limited in its application to the particular form of DMCP illustrated here, however, and is potentially applicable in other multi-mode charge pump circuits whether they be known or, as yet, unknown.

FIG. 2 shows more internal detail of the DMCP 100. Were it can be seen that switch array 110 comprises six main switches S1-S6 each controlled by a corresponding control signal CS1-CS6 from the switch control module 120. The switches are arranged such that first switch S1 is connected between the positive plate of the flying capacitor Cf and the input voltage node N10, the second switch S2 is between the positive plate of the flying capacitor and first output node N12, the third switch S3 is between the positive plate of the flying capacitor and common terminal N11, the fourth switch S4 is between the negative plate of the flying capacitor and first output node N12, the fifth switch S5 is between the negative plate of the flying capacitor and common terminal N11 and the sixth switch S6 is between the negative plate of the flying capacitor and second output node N13. Optionally, there may be provided a seventh switch S7 (shown dotted), connected between the input voltage source (node N10) and first output node N12. These switches are the ones appropriate to the modes to be described. The provision of further switches to enable other modes of operation is of course not excluded.

It should be noted that the switches can be implemented in a number of different ways (for example, MOS transistor switches or MOS transmission gate switches) depending upon, for example, an integrated circuit's process technology or the input and output voltage requirements. The selection of appropriate implementations is well within the capability of the skilled reader.

Also shown in greater detail is the control module 420 which, at least nationally, comprises mode select circuit 130 for deciding which of two control functions 120a, 120b to use, thus determining which mode the DMCP operates in. The mode select circuit 130 and the controllers 120a, etc. are notional blocks in that they represent different behaviours of the control module in implementing different operating modes of DMCP 100. They can be implemented by separate circuits as just described. In practice, they are just as likely to be implemented by a single circuit block or sequencer with hardwired logic and/or sequencer code determining which behaviour is implemented at a given time. In addition to functions 120a and 120b for implementing the Modes 1 and 2 respectively, the control module implements functions 120ab and 120ba to implement transitions from Mode 1 to Mode 2 and from Mode 2 to Mode 1. Again these functions may be implemented by separate control logic, separate sequencer programs, or by variations within the other functions, as will be described further below. As also described below, where a given mode can be implemented in a range of variants, the designer may select variants which simplify the generation of the control signals, when all the different modes are considered together.

DMCP Operation—Mode 1

In a main operational embodiment of Mode 1, there are three basic states of operation, repeated in high-frequency cycles of three phases, which may be referred to as P1, P2, P3. When DMCP 100 is operating in Mode 1, switch S7, where present, is always open and is therefore not shown when describing this mode.

Figure 3A:
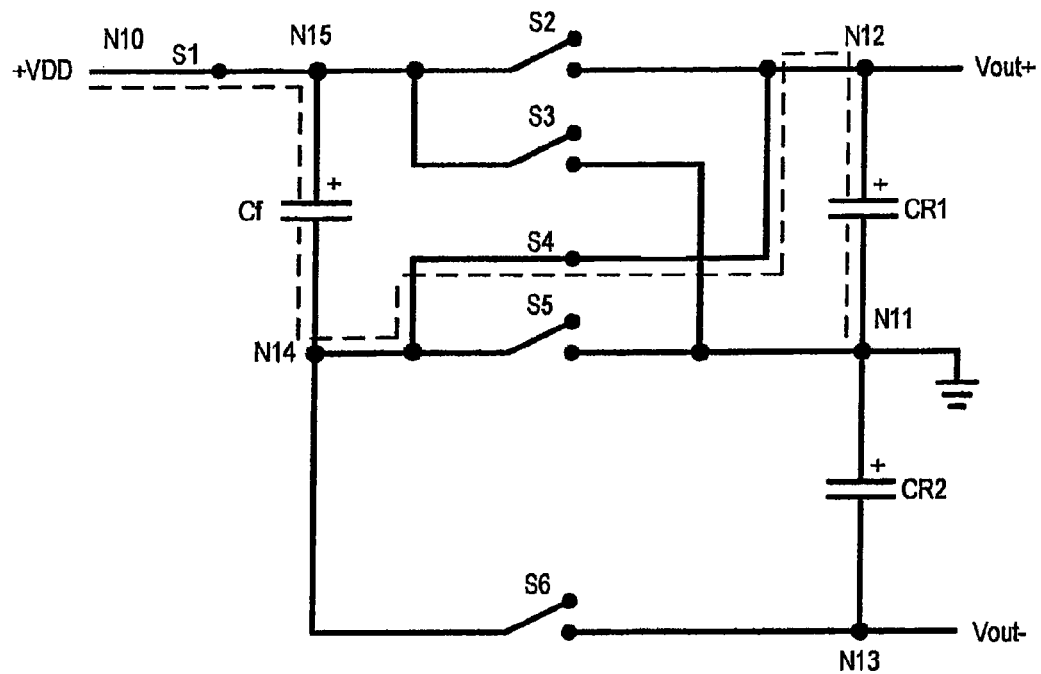
FIGS. 3a and 3b show, respectively, the circuit with the switch array in a first state and an equivalent circuit of this state.
Figure 3B:
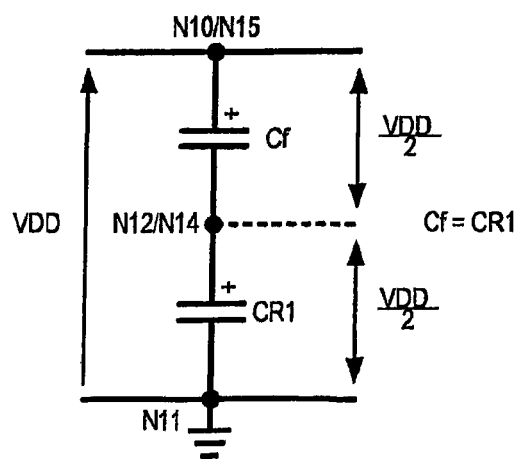

FIGS. 3a and 3b show the switch array 410 operating in a first state, "State 1". Referring to FIG. 3a, switches S1 and S4 are closed such that capacitors Cf and CR1 are connected in series with each other and in parallel with the input voltage +VDD. Therefore, capacitors Cf and CR1 share the input voltage +VDD that is applied across them. FIG. 3b shows an equivalent circuit for the state 1 operation with voltage +VDD effectively applied across nodes N10 & N11.

It is preferable for applications that require symmetrical, but opposite polarity, output voltages, that the values of capacitors Cf and CR1 are equal such that each capacitor Cf, CR1 changes voltage by an equal increment when connected in series across a voltage source. If both capacitors are initially discharged, or indeed previously charged to any equal voltages, they will end up each with a voltage equal to half the applied voltage source, in this case one half of the input voltage VDD.

Figure 4A:
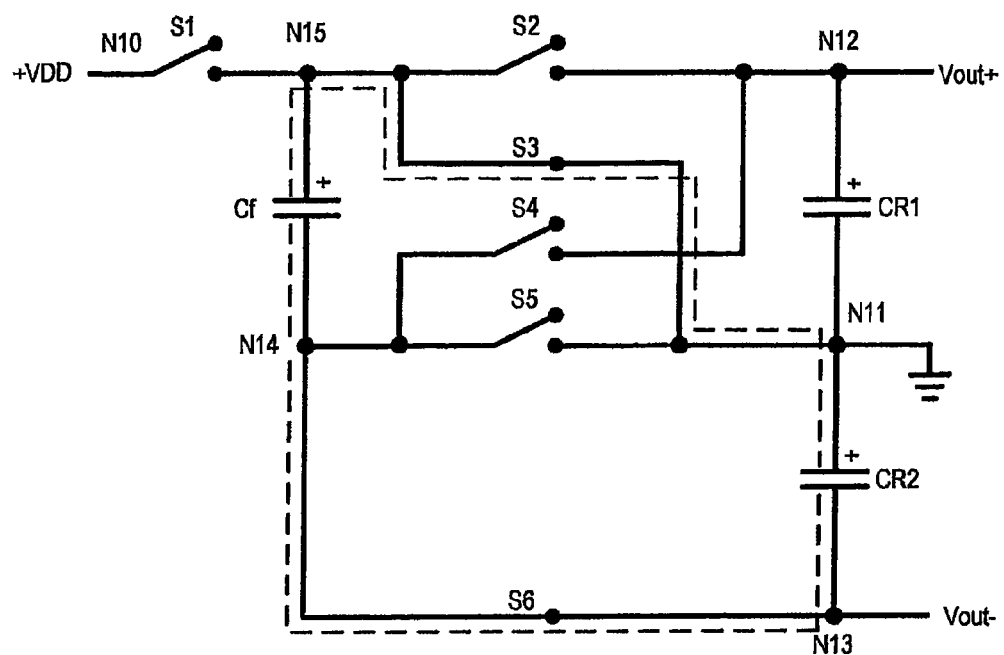
FIGS. 4a and 4b show, respectively, the circuit of with the switch array in a second state and an equivalent circuit of this state.
Figure 4B:
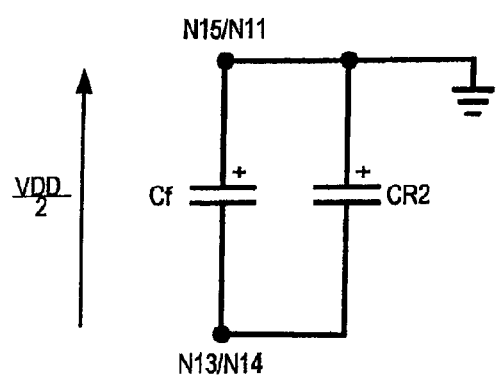

FIGS. 4a and 4b show the switch array 410 operating in a second state, "State 2". Referring to FIG. 4a, switches S3 and S6 are closed such that capacitors Cf and CR2 are connected in parallel with each other and between nodes N11 and N13. Therefore, the voltage across capacitor Cf equalises with that across capacitor CR2. FIG. 4b shows an equivalent circuit for this State 2 condition.

It should be noted that the value of reservoir capacitor CR2 does not necessarily need to be the same as that of flying capacitor Cf. If capacitor CR2 is much larger than capacitor Cf, it will require more cycles to charge up to or close to VDD/2. The value of reservoir capacitor CR2 should be chosen depending upon expected load conditions and required operating frequency and output ripple tolerance.

Over a plurality of cycles alternating only States 1 and 2, the voltages across the capacitors Cf and CR2 would, under ideal conditions, converge to a voltage +/−VDD/2. However, the presence of a significant load on the charge pump's output terminals will result in a respective voltage droop in Vout+, Vout− away from +/−VDD. If the load is symmetric, and there is equal current magnitude on both Vout+ and Vout−, then the symmetry of the system will result in both outputs drooping by the same amount.

However, if, for example, there is a significant load on Vout+ but no load or a light load on Vout−, then the voltage across capacitor CR1 will reduce. This will result in a larger voltage across capacitor Cf at the end of State 1 which will then be applied to capacitor CR2 in State 2. If only States 1 and 2 were used, the flying capacitor Cf would then be connected in series with capacitor CR1 in State 1 but still having a larger voltage across it, even initially. Therefore, voltages Vout+ and Vout− will both tend to droop negatively, that is to say that the common mode is not controlled.

Figure 5A:
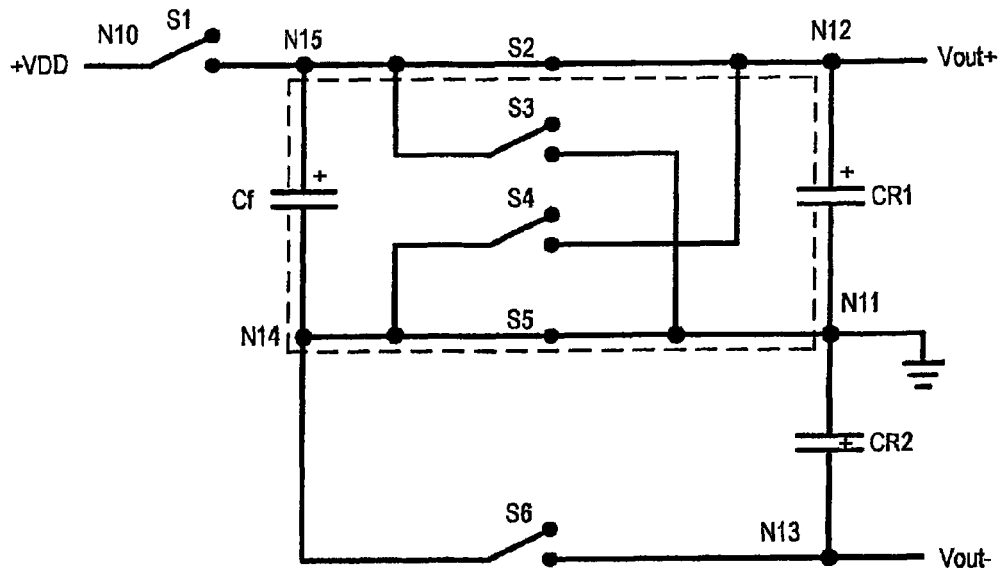
FIGS. 5a and 5b show, respectively, the circuit with the switch array in a third state and an equivalent circuit of this state.
Figure 5B:
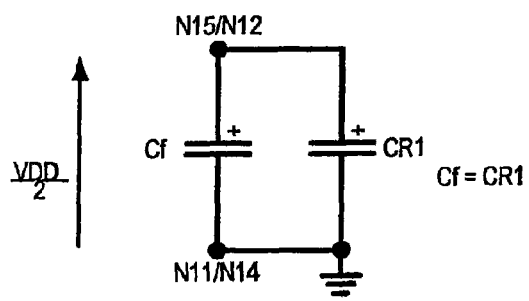

To avoid this effect, a third state, State 3, is introduced, and States 1 to 3 are repeated in Phases 1 to 3 over successive cycles. FIGS. 5a and 5b show the switch array 410 operating in this State 3 operation. Referring to FIG. 5a, in State 3, switches S2 and S5 are closed such that capacitors Cf and CR1 are connected in parallel with each other and between nodes N11 and N12. Therefore, both capacitors Cf and CR1 become charged up to an equal voltage, despite any difference between of their previous voltages. In steady state (after many cycles) this becomes approximately VDD/2. FIG. 5b shows an equivalent circuit for this State 3 condition.

The circuit, therefore ends State 3 with equalised voltages, after which it returns to State 1. Consequently the circuit will, in principle, enter Phase 1 of the next cycle in State 1 with Vout+=+VDD/2, depending upon load conditions and switching sequence.

In States 2 and 3, the voltages across the various capacitors that are connected in parallel may not actually, in practice, completely equalise in a single sequence, particularly if the switching frequency is high, relative to the DMCP's R-C time constant. Rather, in each sequence of states a contribution of charge will be passed from capacitor to capacitor. This contribution will bring each output voltage to the desired level under zero, or low, load conditions. Under higher load conditions, the output reservoir capacitors CR1, CR2 will typically achieve a lower voltage (with some ripple). The size of each of the capacitors needs simply to be designed such that the reduction of common mode drift is within acceptable bands, for all expected load conditions, Alternatively, or in addition, larger switches, with less on-resistance, could be employed.

Figure 6:
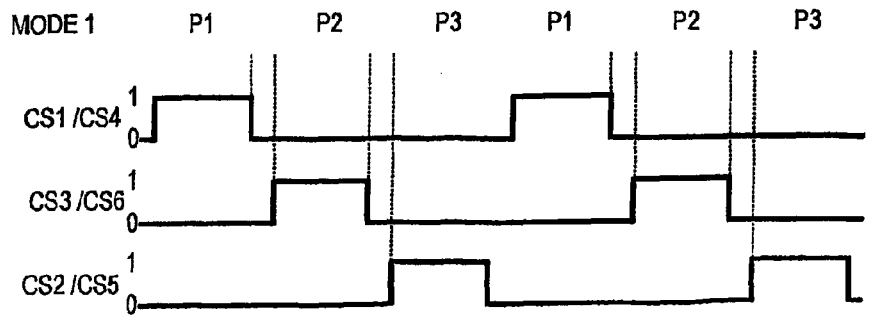
FIG. 6 is a timing diagram showing three switch control signals for the circuit of FIGS. 1 and 2 operating in a first main mode (Mode 1)

FIG. 6 illustrates the non-overlapping control signals (CS1-CS6) for controlling the switches (S1-S6) during the three states (1, 2 and 3) of the main operational embodiment of Mode 1. As discussed above, this represents only one example out of many possibilities for the controlling sequence.

It should be appreciated that the open-loop sequencing of the above three states does not necessarily need to be observed. For example the state sequences could be: 1, 2, 3, 1, 2, 3 . . . (as described above); or 1, 3, 2, 1, 3, 2 . . . ; or 1, 2, 1, 3, 1, 2, 1, 3. It should also be apparent that it is not necessary that the third state be used as often as the other two states, for instance a sequence of 1, 2, 1, 2, 1, 2, 3, 1 . . . can be envisaged. It may even be envisaged to dispense with the third state altogether, albeit only, in the case of well-balanced loads, or with alternative schemes for common-mode stabilisation.

Other switching and sequencing scenarios exist. For example, in one alternative operational Mode 1 embodiment State 1 could be replaced by a fourth state, "State 4" whereby switches S1 and S5 are closed (all other switches are open). In this state capacitor Cf charges up to input voltage +VDD. A fifth state, "State 5" would then operate with switches S2 and S6 closed (all other switches open) such that flying capacitor Cf is connected across reservoir capacitors CR1 and CR2 in series (which, in this scenario, may be equal in capacitance). This particular example of an alternative switching and sequencing scenario has the drawback that there is no common-mode control and therefore would suffer from common-mode drift. However, this common-mode drift can be "reset" by altering the switching sequence at appropriate intervals during the "normal" switching and sequencing cycle. These alterations can be predetermined, or initiated in response to observed conditions.

It should be noted that the sizes of capacitors Cf, CR1, CR2, can be selected to meet the required ripple tolerances (versus size/cost) and consequently the clock phase duration for each state need not necessarily be of ratio 1:1:1.

While the above describes an embodiment wherein Mode 1 generates outputs of +/−VDD/2, it will be understood by the skilled person that the above teaching could be used to obtain outputs of any fraction of VDD by increasing the number of flying capacitors Cf and altering the switch network accordingly. The relationship between output and input in this case is Vout+/−=+/−VDD/(n+1) where n equals the number of flying capacitors Cf. It will also be appreciated that circuits with more than one flying capacitor as described will still be capable of generating outputs of +/−VDD/2 as well as outputs for every intermediate integer denominator between +/−VDD/2 and +/−VDD/(n+1) depending on its control. For example, a circuit with two flying capacitors can generate outputs of VDD/3 and VDD/2, one with three flying capacitors can generate outputs of VDD/4, VDD/3 and VDD/2 and so on.

DMCP Operation—Mode 2

As mentioned above, the DMCP is also operable in a second main mode, Mode 2, where it produces a dual rail output of +/−VDD (+VDD again being the input source voltage level at node N10). In Mode 2, switch S4 is always open.

Several variations of Mode 2 are possible, which will be described below and referred to as Modes 2(a), 2(b), 2(c) and 2(d). Optional switch S7 is required for Modes 2(c) and (d).

Figure 7A:
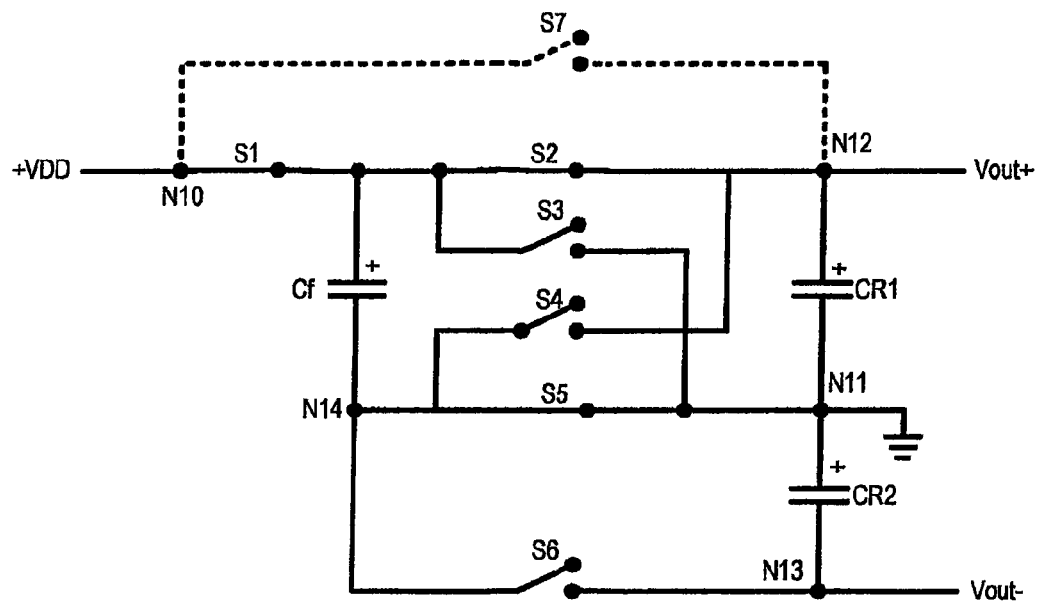
FIGS. 7a and 7b show, respectively, the circuit with the switch array in a sixth state and an equivalent circuit of this state.

In Mode 2(a) the DMCP has two basic states of operation. FIG. 7a shows the circuit operating in the first of these states, "State 6". In this state, switches S1, S2 and S5 are closed (S3, S4 and S6 are open). This results in capacitors Cf and CR1 being connected in parallel across the input voltage +VDD, between nodes NW & N11. Therefore, capacitors Cf and CR1 each store the input voltage +VDD. FIG. 9b shows an equivalent circuit for the State 6.

Figure 7B:
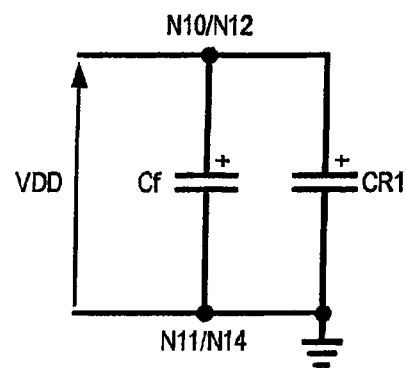
Figure 8A:
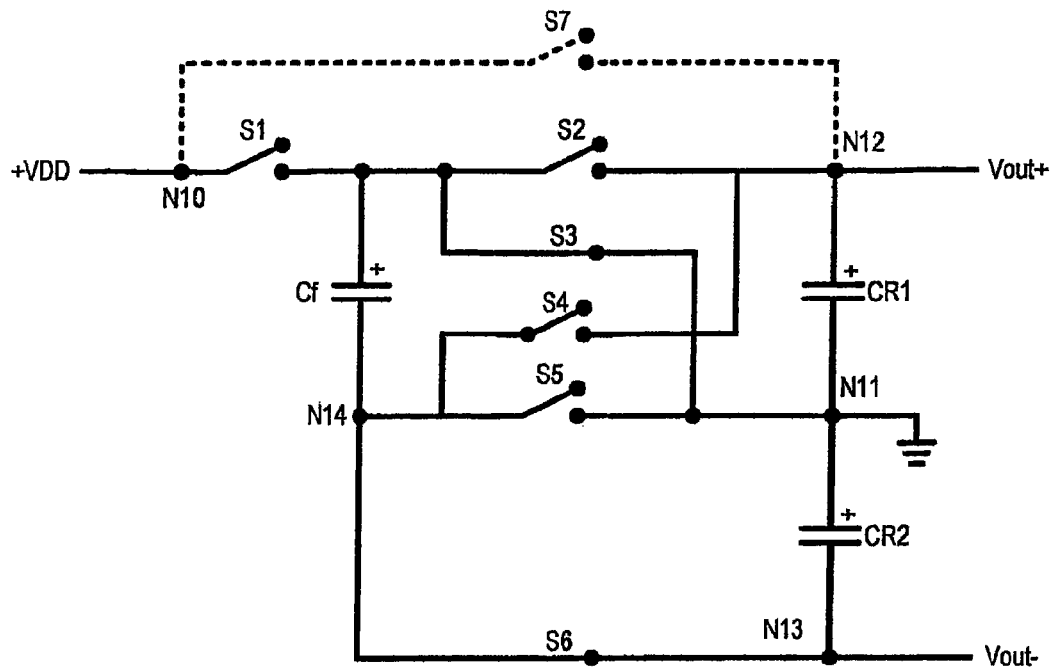
FIGS. 8a and 8b show, respectively, the circuit with the switch array again in the second state and an equivalent circuit of this state.
Figure 8B:
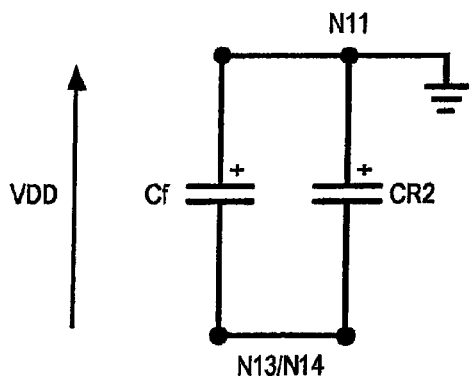

FIG. 7b shows the circuit operating in the second of these states, which is in fact the same state as State 2 in Mode 1, whereby switches S3 and S6 are closed (S1, S2, S4 and S5 are open). Therefore capacitors Cf and CR2 are connected in parallel between common node N11 and second output node N13. Therefore, capacitors Cf and CR2 share their charge and Node 13 exhibits a voltage of −VDD after a number of cycles. FIG. 10b shows an equivalent circuit for this State 2.

Figure 9:
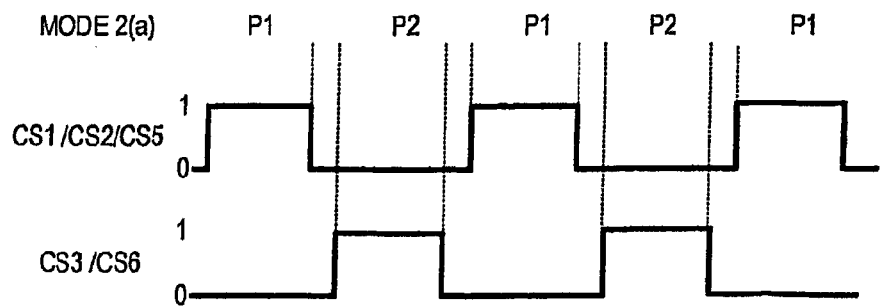
FIG. 9 is a timing diagram showing control signals in a first variant of a second main mode of operation (Mode 2(a))

FIG. 9 illustrates the non-overlapping control signals (CS1-CS3 & CS5-CS6) for controlling the switches (S1-S3 and S5-S6) during the two alternating states of Mode 2(a). The sequence of states in this mode is therefore 6, 2, 6, 2, 6, . . . etc.

Figure 10A:
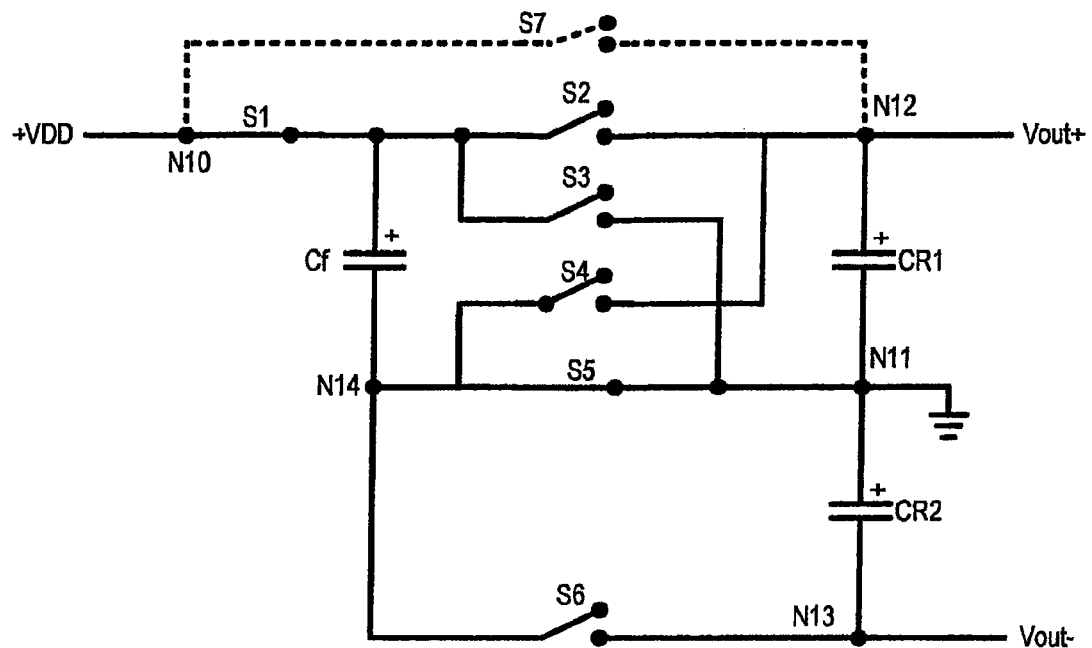
FIGS. 10a and 10b show, respectively, the circuit with the switch array in a seventh state and an equivalent circuit of this state.
Figure 10B:
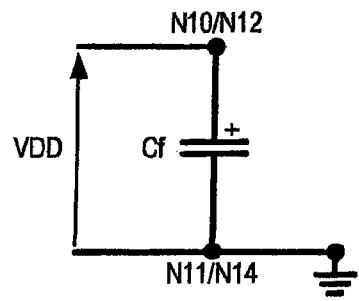

FIG. 10a shows an additional state, "State 7", which can be introduced into this Mode 2(a) sequence to create a slightly different implementation, referred to now as Mode 2(b). In State 7, switches S1 and S5 are closed (S2, S3, S4 and S6 are open). This State 7 connects the flying capacitor Cf across the input voltage +VDD. This state can be followed by States 6 then 2 and then back to 7 etc., FIG. 10b shows an equivalent circuit for this State 7.

Figure 11:
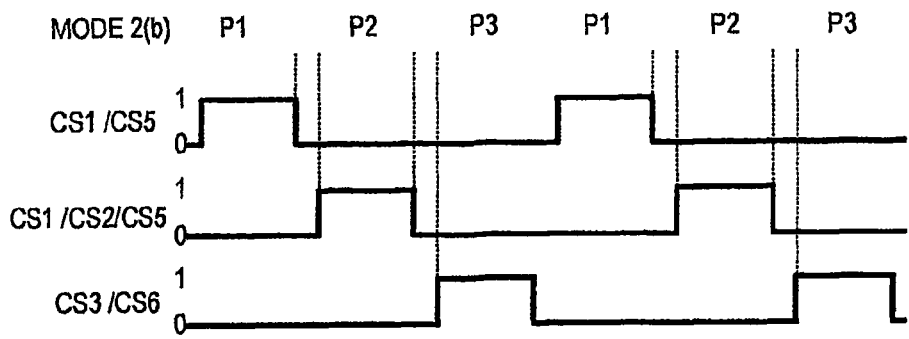
FIGS. 11, 12 and 13 are timing diagrams showing switch control signals in second, third and fourth variants of the second main mode of operation (Mode 2(b), 2(c), 2(d) respectively)

FIG. 11 illustrates the non-overlapping control signals (CS1-CS3 & CS5-CS7) for controlling the switches (S1-S3 and S5-S7) to generate a repeating sequence of the three states 7, 6, 2, 7, 6, 2, etc. . . . that defines Mode 2(b). Again, this represents only one example out of many possibilities for the controlling sequence. The inclusion of State 7 before State 6 is intended to isolate CR1 from the influence of CR2, and hence combat cross-regulation. On the other hand, the inclusion of State 7 reduces the time available for charge transfer in the main States 2 and 6, so that regulation as a whole may be improved if State 7 is simply omitted (Mode 2(a)). These are design choices.

Whichever pattern is chosen, one of the states may be used less frequently than the others (as was described above in relation to Mode 1). For instance, if the loads on the two output nodes N12, N13 are unbalanced (either permanently or according to signal conditions), one of the States 6 and 2 could be included less frequently than the other, as capacitor CR1 may need to be charged less frequently than capacitor CR2 or vice versa.

Modes 2(c) and (d) are further alternative modes of operation to generate +/−VDD, which are possible when the DMCP is provided with switch S7. This switch may used to replace the combined functionality of switches S1 and S2 for generating the positive output voltage at node N12 in applications where the high-side load, i.e. the load connected between nodes N12 and N11, does not require a lot of current. This may be where the load has a high input resistance as with a "Line Output" for a mixer for example. In such a case the size and the drive requirements of switch S7 can be reduced and modified compared to those of switches S1 and S2. Indeed, switch S7 can be constantly switched on during operation in Mode 2(c) which has advantages in that there is less power required to drive the switches and switch S7 would not, in the case of a MOS switch implementation, inject any charge into either nodes N10 or N12 due to its parasitic gate-drain and gate-source capacitances. It should also be noted that switch S1 is still required to operate so as to generate the negative output voltage −VDD. Still further, it should be noted that switch S2 may be operated on an infrequent basis so as to also connect the flying capacitor Cf and high-side reservoir capacitor CR1 in parallel.

Figure 12:
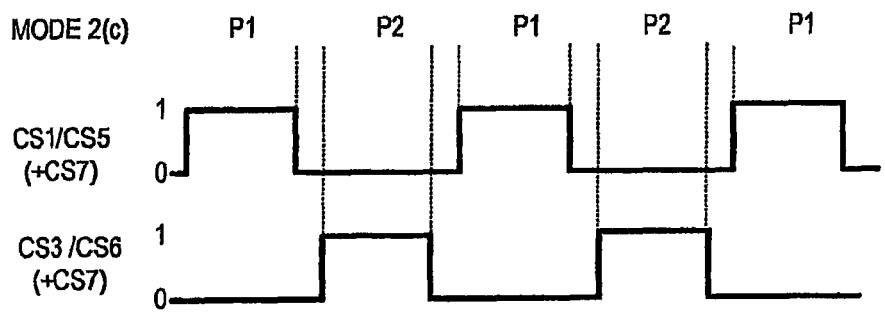

FIG. 12 illustrates the non-overlapping control signals (CS1-CS3 & CS5-CS7) for controlling the switches (S1-S3 and S5-S7) during the two alternating states of Mode 2(c). Summarising Mode 2(c), therefore, switch S7 is permanently (or near permanently) closed. A modified State 6 is used to charge the flying capacitor Cf and capacitor CR1 in parallel, this now being achieved by having switches S1, S5 and S7 closed only. A modified State 2 is then used to transfer this charge to capacitor CR2 via switch S3, S6 as before, but this time with capacitor CR1 still having voltage VDD across it due to S7 being closed.

Figure 13:
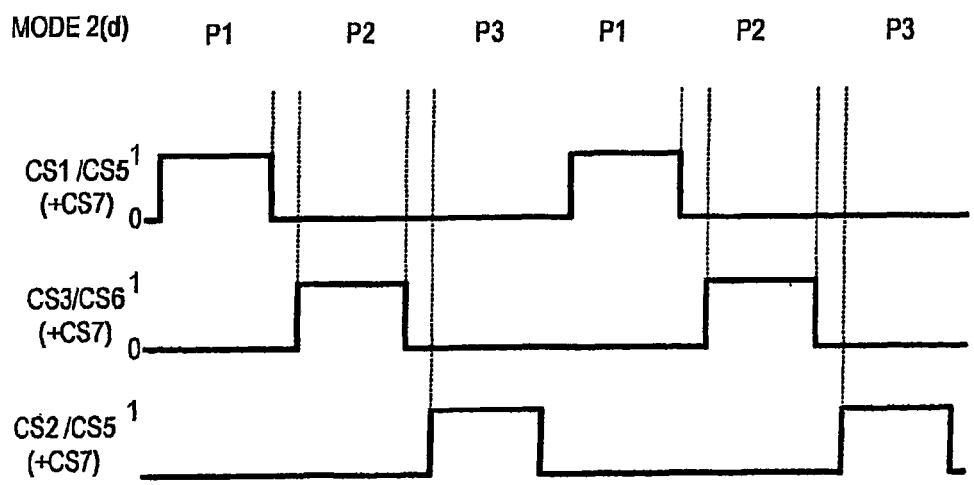

FIG. 13 illustrates non-overlapping control signals (CS1-CS3 & CS5-CS7) for controlling the switches (S1-S3 and S5-S7) during three states in a variation of Mode 2(c) referred to as Mode 2(d). The difference relative to Mode 2(c) is similar to the difference between Modes 2(a) and 2(b), in that an extra phase is inserted with the switches in State 7, wherein switches S1 and S5 are closed (S2, S3, S4 and S6 are open; S7 can remain closed throughout). Note that Mode 2(d) follows a sequence 7, 2, 6, 7, 2, 6 . . . rather than 7, 6, 2. There is not necessarily any great difference in the effect of these modes, but the freedom to vary the sequence can simplify the control logic, as will be seen in the discussion below.

TABLE 1

|  | S1 | S2 | S3 | S4 | S5 | S6 | S7* |
|---|---|---|---|---|---|---|---|
| State 1 | 1 | 0 | 0 | 1 | 0 | 0 | 0 |
| State 2 | 0 | 0 | 1 | 0 | 0 | 1 | 1[++] |
| State 3 | 0 | 1 | 0 | 0 | 1 | 0 | 0 |
| State 4 | 1 | 0 | 0 | 0 | 1 | 0 | 0 |
| State 5 | 0 | 1 | 0 | 0 | 0 | 1 | 0 |
| State 6 | 1 | 1 | 0 | 0 | 1 | 0 | 0 |
| State 6[+] | 1 | 0 | 0 | 0 | 1 | 0 | 1 |
| State 7 | 1 | 0 | 0 | 0 | 1 | 0 | 0 |
| State 7[++] | 1 | 0 | 0 | 0 | 1 | 0 | 1 |

*if present
[+]Modes 2c and 2d
[++]Mode 2d

Table 1 illustrates the switch (S1-S7) states for the seven states described above, with a "0" representing an open switch and a "1" representing a closed switch. The modified state 7[++] with switch S7 closed is only used for transitions from level-shifting to full Note that the switch network and controller do not need to implement all states 1 to 7, if only a subset of the described modes will be used in a particular implementation.

Again, these four example sequences and seven or eight different states of the switch network are not the only possibilities for the controlling sequence. Again, a number of different sequence implementations are possible and some of these states may be used less frequently than others, depending on load.

Transition Modes

Provided that the input supply is tolerant of a wide range of loads at its output, the DMCP described above can be switched between Mode 1 and Mode 2 simply by selecting the appropriate set of wave forms in response to a mode selection signal generated by a user or, more likely, supply control logic. On the other hand, to switch modes suddenly can have undesirable consequences on the connected circuits. For example, in transition from Mode 1 to Mode 2, where the output voltages are to rise from +/−VDD/2 to +/−VDD, simply switching the clocking scheme during operation will result in a large current being taken from the input supply, in order to ramp the voltages from half to full-scale. Similarly, in transition from full VDD down to VDD/2 when changing from Mode 2 back to Mode 1, simply switching the clocking scheme directly from one mode to the other could result in a large current from the reservoir capacitors being pushed back into the input supply. In either case, if the input supply is not designed to accept such conditions, it may be disrupted in its operation, and functions elsewhere on the same chip may be disrupted also.

Figure 14:
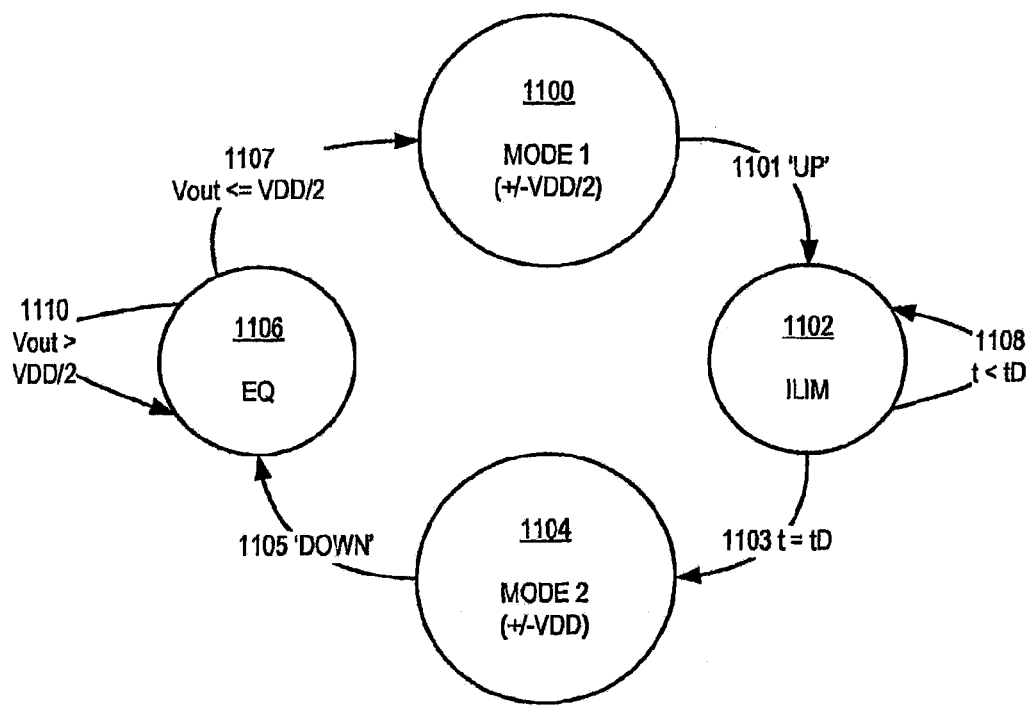
FIG. 14 is a state transition diagram illustrating the use of transitional modes when changing operation from Mode 1 to Mode 2 and vice versa.

FIG. 14 is a state transition diagram illustrating the inclusion of transitional modes in the operation of DMCP 100, which are effective to mitigate the above problems. Starting in Mode 1 operation (state 1100), the output voltages are assumed to be steady at +/−VDD/2. At a later time, mode select circuit 130 decides that an 'UP' transition is desired, that is a transition to Mode 2. Rather than pass directly to Mode 2 operation, however, the control wave forms are generated to implement the current limiting transitional mode 1102. After a certain Time tD transition 1103 is permitted, leading to Mode 2 operation (1104). During this time delay in the current limiting mode, excessive currents will not be drawn from the input supply, and the output voltages on capacitors CR1 and CR2 rise more gently from half to full VDD. Similarly, when a 'DOWN' transition is instructed at 1105, operation does not pass directly to Mode 1 again, but rather enters a transition mode referred to as equalisation (EQ) mode 1106. Detail of the implementation of this mode will be given below. Essentially in EQ mode the circuit disconnects the charge pump from the input supply, and waits until the load currents bring the output voltages down to VDD/2. Once this is achieved, the transition 1107 is permitted to enter Mode 1 proper.

In the example of an audio amplifier, it may be that the transition from Mode 1 to Mode 2 is triggered by an increase in a volume control signal, for example. (Reducing the supply voltage to the audio output stage when signal levels are low greatly reduces power dissipation in the output stage transistors.) Mode select circuit 130 in that case will be arranged to intercept the volume control signal and arrange for an orderly transition to Mode 2 operation, permitting the actual volume increase at the audio output stage to proceed only after the supply voltages have established themselves at their full +/−VDD level. Conversely, if the volume control is moved down again so as to indicate a transition to Mode 1 operation is desirable, the output stage volume is reduced first, prior to initiating the 'DOWN' transition 1105. In this way, the demand on the output supplies generated by the charge pump is managed so as to permit an orderly transition of the output voltages between modes.

Possible implementations of these transition modes will now be illustrated in detail.

Transition Mode ILIM

Figure 15:
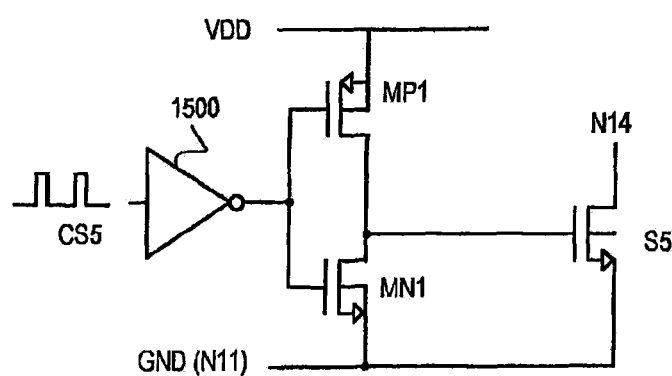
FIG. 15 shows a conventional on/off switch driver circuit useful in the circuit of FIGS. 1 & 2.

FIG. 15 illustrates a conventional switch driving circuit, in which the switch S5 of DMCP 100 is shown implemented by an NMOS transistor. Drive arrangements can be inverted of course in the case of a PMOS switch transistor, and replicated in complementary form for a 2-transistor transmission gate. In the simple driver of FIG. 15, a PMOS/NMOS transistor pair MP1, MN1 are driven from control signal CS5 by an inverter 1500. The switch S5 is thus turned on whenever signal CS5 is high, and turned off when CS5 is low. The reader will appreciate that there is no intermediate state of the switch, so that current through it is limited only by the on-resistance of the switch S5. For minimising the output impedance of the charge pump as a whole, the resistance of switch S5 should of course be minimised, and the current for charging and transferring charge between the various capacitors of the circuit should not be unduly restricted.

As discussed above, however, the current demand of the charge pump may become undesirably high during transitional states, for example initial start-up and also transition from the low voltage Mode 1 to the higher voltage Mode 2, while other functional blocks may wish to continue operating from the fixed supply VDD. Accordingly, the inventors propose a transitional mode ILIM, in which current through one or more switches of the charge pump switch network 110 is limited to a predetermined level. In the present example, limiting current in switch S5 provides a useful manner of implementing such a limit. In principle, the current limit could be maintained throughout operation. In order to minimise output impedance of the charge pump during normal operation, and hence avoid the need for excessively large capacitors and their associated cost and size, it is preferred for the switch to have no current limit during normal operation.

A number of different manners can be considered for implementation of the current limit. One option would be to make the NMOS transistor that is switch S5 with a suitably high on-resistance. Two or more parallel switches could be controlled so as to increase on-resistance progressively. A preferred option, however, is to operate the switch as a constant current source, rather than a simple resistance.

Figure 16:
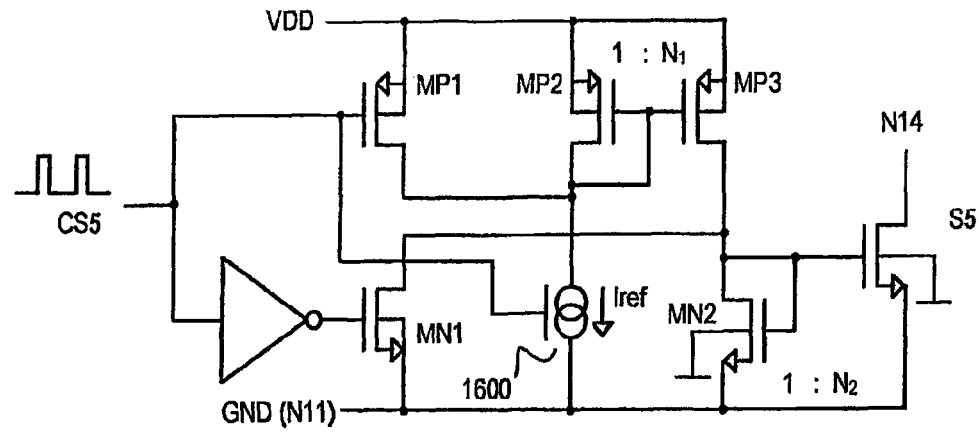
FIG. 16 shows a first current limited switch driver circuit suitable for use in the circuit of FIGS. 1 & 2.

FIG. 16 shows a current-limiting switch driver of a form which is generally known for other applications. This operates according to the well-known principles of current mirroring, based on a fixed reference current Iref provided by a reference current source 1600. Current source 1600 can be turned on and off by a control signal, connected in this case to receive signal CS5 and so not to consume when not required. Transistors MP2 and MP3 are arranged to receive this reference current and multiply it by a factor $N_1$ which may for example be 10. The multiplied current is then received by a second current mirror comprising input transistor MN2 and the switch S5 itself. The ratio between these transistors may be much greater, for example $N_2$=2000. A current of 400 milliamps, for example, might be set as the limit for switch S5. Since the switch is open for less than one third of a cycle, the average current drawn is much lower, of course. These first and second current mirrors are gated on and off by control signal CS5 acting through transistors MP1 and MN1 as appropriate.

While the FIG. 16 circuit would operate satisfactorily to provide a current limited switch S5, it has a certain inefficiency. In particular, the reference current Iref and its multiple $N_1$ (Iref) are drawn from the input supply VDD whenever CS5 is high, irrespective whether any current is actually needed to be drawn through the switch S5 itself. In some fields of application, this unproductive drain on the supply may be acceptable. However, it is an aim of the invention to minimise as far as possible power consumption in power-critical applications, such as portable music players, mobile telephones and like.

Figure 17:
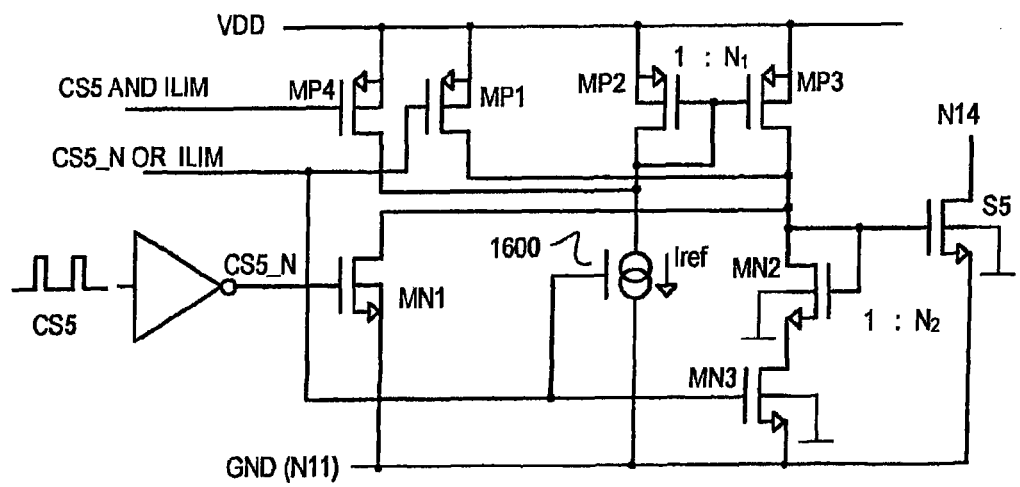
FIG. 17 shows a modified current limited switch driver used for implementation of a current limited transition mode in a preferred embodiment of the circuit.

FIG. 17 shows a novel switch drive circuit, which is responsive to signal CS5 and also to a mode indicating signal ILIM, which is asserted (set to '1') by the mode select circuit 130 whenever the circuit is in the ILIM state (1102 in FIG. 14). The manner of operation of the circuit should be self-explanatory. Briefly, transistors MP2, MP3, MN2 and switch S5 perform their same function as in FIG. 16, during the times when ILIM is high. On the other hand, by the provision of additional transistors MN3 and MP4 controlled by two logic signals (CS5.ILIM) and (CS5_N+ILIM) transform the circuit to operate in a non-current limited mode when signal ILIM is low. Specifically, the current mirror formed by transistors MP2 and MP3 is shut down by transistor MP4, unless both CS5 and ILIM are high. Similarly, current mirror transistor MN2 is isolated from ground (N11) unless ILIM is high or CS5 is low. Conversely, when ILIM is low and CS5 is high, transistor MP1 is turned on to drive directly the gate of switch transistor S5, effectively as shown in FIG. 15. When CS5 is low, transistor MN1 disables the switch transistor directly, again as in FIG. 15.

The novel switch drive circuit of FIG. 17 thereby provides both of the desired functions at different times: a current limited switch function responsive to signal CS5 whenever signal ILIM is high, and a low-resistance on-off switch function responsive to signal CS5 when ILIM is low. Referring again to the state transition diagram of FIG. 14, signal ILIM is inserted high by mode selector circuit 130 after the 'UP' mode change is triggered, and remains high for a predetermined delay time tD. This delay may be implemented for example by counting a pre-determined number of switching cycles.

By providing management of the transitional or "in-rush" currents in this way, the transition mode ILIM allows a desired overall performance level to be obtained with more compact and cheaper components. In particular, to achieve a very small form factor in a portable device, while still providing high quality drive for connected headphones and the like, an input decoupling capacitor (Cin in FIG. 1) may be reduced from, say, 10 microfarads to 2 microfarads, with obvious benefits in cost and size. The total delay may only be a few milliseconds, calculated according to the known parameters of the voltages before and after each transition, the sizes of the capacitors, expected load currents and so forth.

In operation, the control signals for any of the modes 2 (a) to (d) can be generated as shown in FIG. 9, 11, 12 or 13 by suitable logic or programming in the controller. Where mode 2(d) is used, for example, the transitional mode ILIM can be implemented by simply asserting signal ILIM in parallel with the normal signals during the transitional period tD. On the other hand, since the aim of the current limiting model ILIM is to limit demand from the input supply, and not to inhibit transfer of charge from the flying capacitor to the output capacitors, performance may be improved by asserting ILIM only during the first phase of each cycle, when reservoir capacitor CF is connected to the input supply VDD (phase P1 in FIG. 11, for example, but not phase P2).

While all of the variations on Mode 2 perform essentially the same function as described above, it may be noted that Mode 2(d) (FIG. 13 waveforms) differs from Mode 1 (FIG. 6 waveforms) only in the first phase. Accordingly, implementation of the sequencers 120a etc may be simplified if the waveforms of FIGS. 6 and 13 are chosen for implementation of Mode 1 and 2 respectively, as these can be modified very simply to implement also the transitional mode ILIM. Where two-phase variants Mode 2(a) or 2(c) are chosen, the waveforms will switch to three-phase at the start of the mode ILIM.

Transition Mode EQ

As further mentioned above, a further transition mode EQ ("equalisation mode") is provided at the "downward" transition from Mode 2 (+/−VDD generated) to Mode 1 (+/−VDD/2 generated). This is particularly to avoid DMCP 100 pumping charge from the reservoir capacitors back into the input supply at node N10, as it attempts to drive the output voltages downward in magnitude. Implementation of Mode EQ is as follows: the Mode 1 switching waveforms such as those illustrated in FIG. 6 are implemented, but with the first phase suppressed, so that switches CS1 and CS4 do not close during Mode EQ. During this operation, it is assumed that load currents are drawn from the output terminals, so that the voltages on reservoir capacitors CR1 and CR2 will, over time, drift downwards. By maintaining the second and third phase operations (CS3/CS6 and CS2/CS5), the flying capacitor is used to equalise the charges on reservoir capacitors CR1 and CR2, so that the output supplies remain balanced as they drift downwards, irrespective of any asymmetry in the load currents.

In cases where the magnitude of the load currents is unknown at the time of designing the circuit, the Mode EQ will not have a fixed duration in the way that the mode ILIM has. Accordingly, in the preferred embodiment, a comparator circuit is provided to compare one or both of the output voltages with the target level VDD/2, and to terminate the mode EQ automatically when the output voltages reach their target level. In one implementation, a resistive divider would be used to derive a reference voltage of VDD/2 between Nodes N10 and N11, this reference level being fed to a comparator which monitors one or other of Vout+ or Vout−. The output of the comparator can be used then to trigger the transition 1107 from mode EQ to Mode 1 proper. Rather than use a resistive divider which would place a constant drain on the input supply, the preferred embodiment samples the output voltages through a switched-capacitor type voltage divider. This dividing operation can be performed in phases P2 and P3, and the subsequent comparison can be performed very briefly during the "spare" first phase P1. A sampling type comparator can be used, again to avoid taking power throughout the cycle. Again if FIGS. 6 and 13 are taken as the basic waveform patterns for implementation of Mode 1 and Mode 2, implementation of the transitional Modes ILIM and EQ can both be made by modifying the control signals generated in just the first phase of the three-phase cycle.

Figure 18:
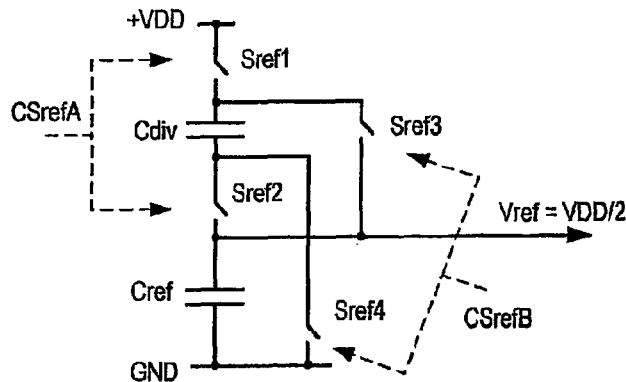
FIG. 18 shows a reference voltage generating circuit used in an "equalisation" transition mode of the circuit.
Figure 19:
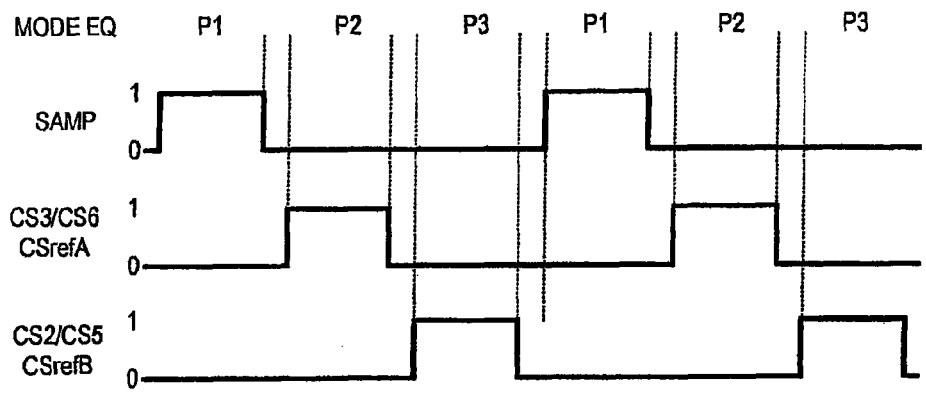
FIG. 19 shows modified control signals implementing the equalisation transition mode.

Explaining the above in more detail, FIG. 18 illustrates the principle of a switched-capacitor voltage divider, and FIG. 19 shows the waveforms generated in mode EQ. Two small (on-chip) capacitors Cdiv and Cref are connected in a divider configuration between input supply VDD and ground. The upper capacitor Cdiv is isolated from the divider by a pair of switches Sref1 and Sref2, both controlled by a control signal CSrefA from the division point an output voltage Vref is taken. Capacitor Cdiv can be connected in parallel with Cref between Cref and ground by operation of two further switches Sref3 and Sref4. These are controlled by a control signal CSrefB. By alternating the signals CSrefA and CSrefB, the input voltage VDD can be divided and then presented at the output as a signal Vref equal to VDD/2.

Referring now to FIG. 19, three non-overlapping control waveforms are shown implementing a three-phase operation based on the Mode 1 waveforms shown in FIG. 6. As mentioned already, in Mode EQ the first phase does not change the control signals CS1 and CS4, but a "sample" signal SAMP is generated to control the comparison step, to be described below. In phase P2, when switches S3 and S6 are closed, control signal CSrefA is asserted, to implement the first phase of the switched capacitor divider operation just described. In the third phase P3, as well as closing switches S2 and S5, the controller asserts signal CSrefB, to connect divider capacitors Cdiv and Cref in parallel, completing the generation of the output voltage Vref=VDD/2.

Figure 20:
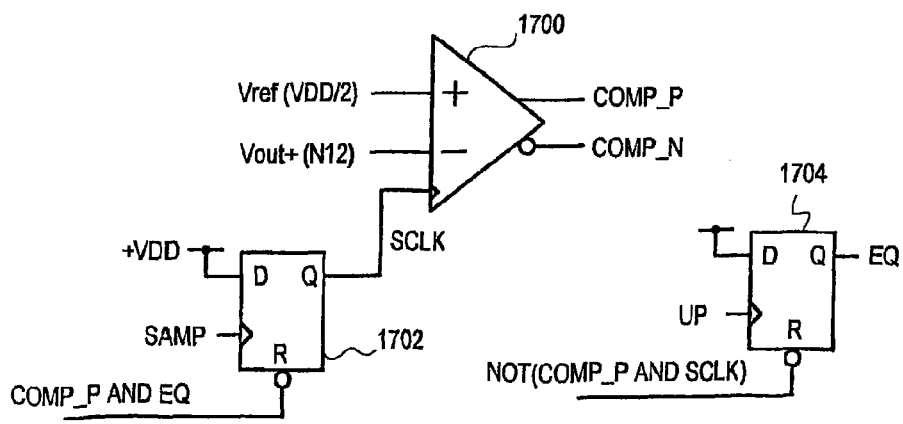
FIG. 20 shows a comparator and control logic used to implement the transition mode.

FIG. 20 illustrates one implementation of the comparator 1700 and associated logic within mode select circuit 130, which generate the mode select signal EQ (output Q of flip-flop 1704). Comparator 1700 receives at its non-inverting input the reference voltage Vref from the divider of FIG. 18, while the inverting input receives the output voltage Vout+ from Node N12. Complimentary output signals COMP_P and COMP_N are generated to indicate which of the two input signals Vref, Vout+ is the higher. Comparator 1700 is a sampling, rather than continuous comparator and receives a clock signal SCLK from the Q output of a first D-type flip-flop 1702. When SCLK is low, both COMP_P and COMP_N are '0', when SCLK goes high the comparator makes the comparison of its inputs and then latches the result on its outputs. When SCLK is low, the outputs are undefined (X) rather than 1 or 0.

Flip-flop 1702 receives as its data input D a logic '1' (VDD). Its clock input receives the waveform SAMP generated as shown in FIG. 19. Its Reset input receives a logic signal which is a logical AND of comparator output COMP_P and the mode signal EQ. Accordingly, so long as the mode is EQ and the output voltage Vout+ remains higher than the target voltage Vref, flip-flop 1702 will trigger a comparison to be made between those voltages during phase 1 of each cycle. A second D-type flip-flop 1704 also has its D input connected to logic 1'. Its clock input is driven by the 'UP' command signal within the mode select circuit 130, while its Reset input is driven by the inverse of a logical AND of COMP_P and SCLK. The result of this is that, so long as Vout+ remains higher than the target voltage Vref, a rising edge on the 'UP' signal will cause the mode indicator EQ to be set high. As soon as the output voltage falls below the target level, COMP_P will go high and the signal EQ, will go low at the next clock.

By the above mechanism, the "spare" first phase of the three-phase cycle is used to sample and compare the output voltage with the target level, allowing the output voltages Vout+ and Vout− to drift under the influence of the load current down to the new desired output level, whereupon the EQ Mode ends automatically and Mode 1 operation commences. Thereafter, the phase P1 connects the flying capacitor Cf and reservoir capacitor CR1 in series across the input voltage, to divide and obtain charge from the input supply, which is then transferred between the reservoir capacitors to generate the positive and negative VDD/2 output supplies.

Figure 21:
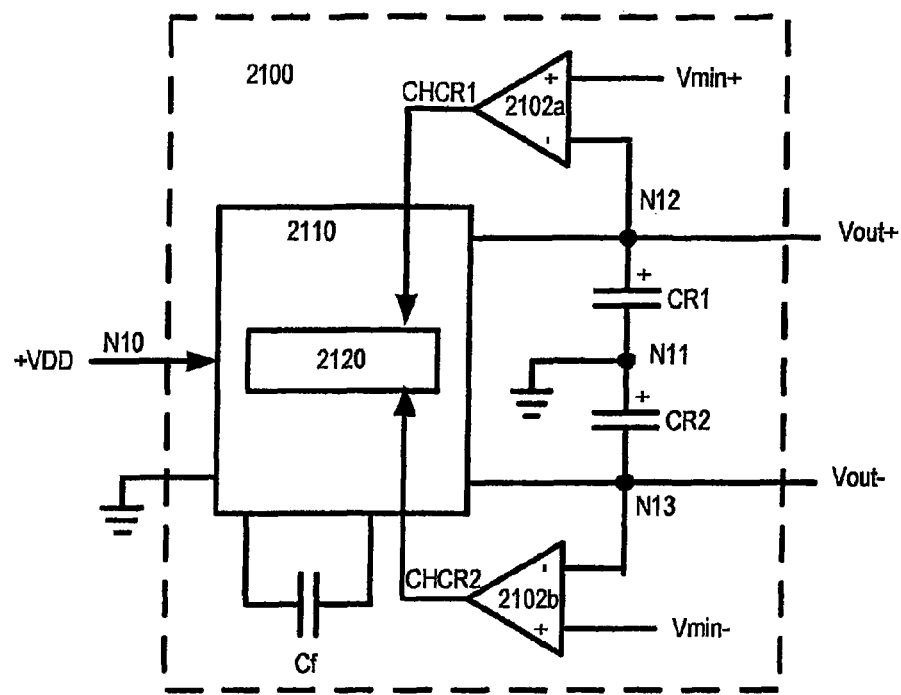
FIG. 21 shows a variation on the circuit of FIG. 4, operable in a closed loop configuration.

FIG. 21 illustrates a DMCP circuit 2100 similar to that illustrated in FIGS. 1 & 2 except that the DMCP 2100 also includes two comparators 2102a, 2102b for regulating the two output voltages.

DMCP 2100 thus represents a DMCP with closed-loop regulation of the output voltages. Each of the comparators 2102a; 2102b compares its respective charge pump output voltage (Vout+, Vout−) with a respective threshold voltage (Vmin+, Vmin−) and outputs a respective charge signal CHCR1 and CHCR2. These charge signals CHCR1, CHCR2 are fed into the switch control module 2120 to control the switch array 2110, causing the DMCP to operate charging either the relevant reservoir capacitor. If either output voltage droops past its respective threshold, the charge pump is enabled; otherwise the charge pump is temporarily stopped. This reduces the power consumed in switching the switches, especially in conditions of light load. As an alternative to providing two comparators, and level-shifted references for the Vout− comparison, the transition Mode EQ can be implemented to allow the output voltages to be kept in balance as their voltage falls, and thus to allow both their voltages both to be sensed, for practical purposes, by a single comparator on Vout+.

This scheme allows variation of the output voltages up to +/−VDD/2. It should be further noted that in this configuration, DMCP 2100 may be used to generate higher voltages, but with a drop in efficiency. In this case, the reference voltages (Vmin+/Vmin−) can be adjusted to adjust the output voltages accordingly. The flying capacitor Cf is charged up to +VDD (via switches S1 and S5) and then connected in parallel across either reservoir capacitor CR1 (via switches S2, S5) or CR2 (via switches S3, S6) to raise their voltages to the levels set by the reference voltages. Such an operation increases the ripple voltages on the reservoir capacitors CR1, CR2 but it also reduces switching losses. By scaling the reservoir capacitors CR1, CR2 relative to the charging Capacitor Cf, the ripple voltages can be reduced. Note that the current-limiting mode of switch S5 can be used effectively in the first phase of such operation, as an alternative or additional means to minimise ripple. As in the transitional mode ILIM described above, the current limiting feature prevents large packets of charge being transferred in spite of the large difference between input and output voltages.

Figure 22:
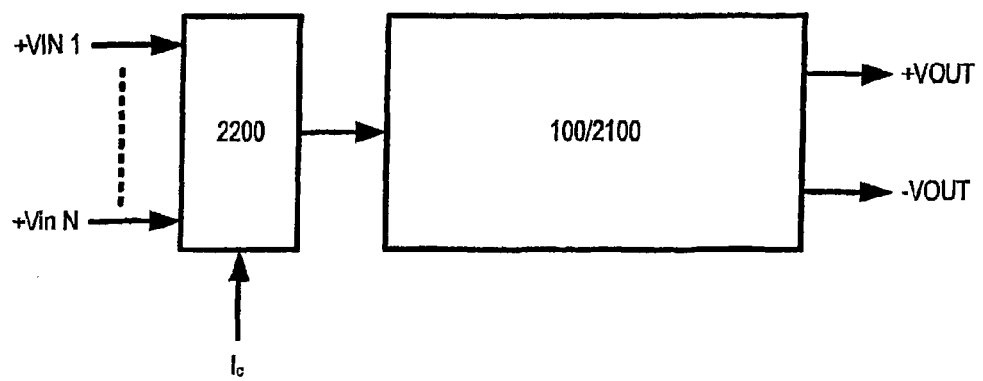
FIG. 22 shows a further embodiment of the invention wherein one of a number of different input voltage values may be selected as an input voltage to any of the Dual Mode Charge Pumps disclosed herein.

FIG. 22 illustrates a further embodiment of any of the novel Dual Mode Charge Pumps 100, 2100 described above, wherein one of a number of different input voltage values may be selected as the input voltage VDD to the DMCP. An input selector 1000 has a number of different voltage inputs (Win 1 to +Vin N), the actual input chosen being determined by control input Ic. The chosen voltage level then serves as the'input voltage VDD for the Dual Mode charge pump 100/2100.

Figure 23:
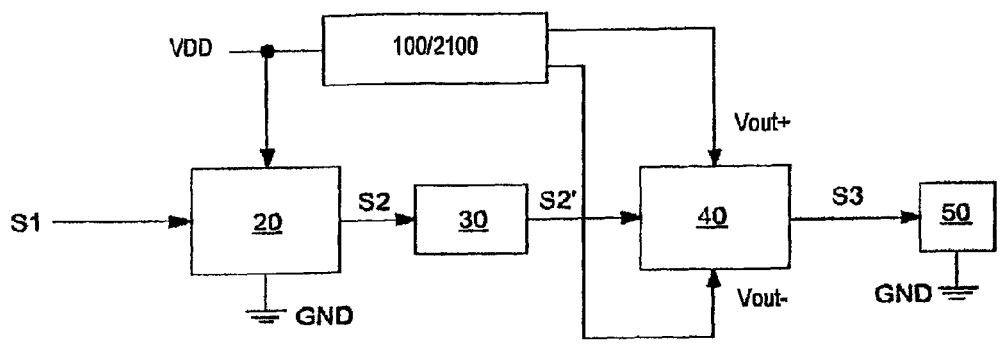
FIGS. 23 and 24 show in block schematic form two amplifier circuits in which any of the Dual Mode Charge Pumps embodying the present invention may be used.

FIG. 23 represents a typical application wherein dual rail supply voltages Vout+ and Vout− are generated by a charge pump such as is as described above, the charge pump 100, 2100 being supplied from a single rail supply voltage VDD for example. (The charge pump 100, 2100 could be supplied by multiple supply voltages as illustrated in FIG. 22.) Labels VDD, Vout+ etc. are to be interpreted in the description associated with FIGS. 23 and 24, to refer to either the respective terminals or the voltage at that terminal, according to context.

Referring to FIG. 23, the supply voltage VDD is illustrated as supplying processing circuitry 20. The input signal S1 maybe an analogue signal or a digital signal. In the case where S1 is an analogue signal then the processing circuitry 20 will be purely analogue type circuitry such as op-amps, multiplexers, gain blocks etc. In the case where S1 is a digital signal and the output stage is analogue, then the processing circuitry 20 may be a mixture of digital and analogue circuitry where signal S1 is fed, either directly or through some digital signal processing, into a DAC (not illustrated) and the output of the DAC is then fed into the analogue circuitry as mentioned above.

The processing circuitry 20 outputs a processed signal S2 that in this particular embodiment is an analogue signal that is passed into a level shifter 30. Level shifter 30 may be implemented by a DC-blocking capacitor for example. An output amplifier 40 is powered by the dual rail supply voltages Vout+ and Vout− generated by the charge pump 100, 2100, and may, in particular embodiments, be at levels +/−VDD/2 or +/−VDD depending on the charge pump's mode of operation.

The input signal S1, if analogue, and analogue signals in the processing circuitry 20, will normally be referenced midway between ground potential and VDD, whereas the level shifted signal S2' is referenced about ground, as required by the output amplifier operating from the split rail supply Vout+, Vout−.

The level shifted signal S2' is fed into the output amplifier 40 which outputs an amplified output signal S3 which is fed into a ground referenced load in the form of signal transducer 50. In the case where the output amplifier 40 is a switching (Class D or PWM) amplifier, or a 1-bit digital (sigma-delta) type output stage, the signals S1, S2 may be digital in form right through to input to output, or may begin in analogue form and be converted to digital form in the processing circuit 20.

Figure 24:
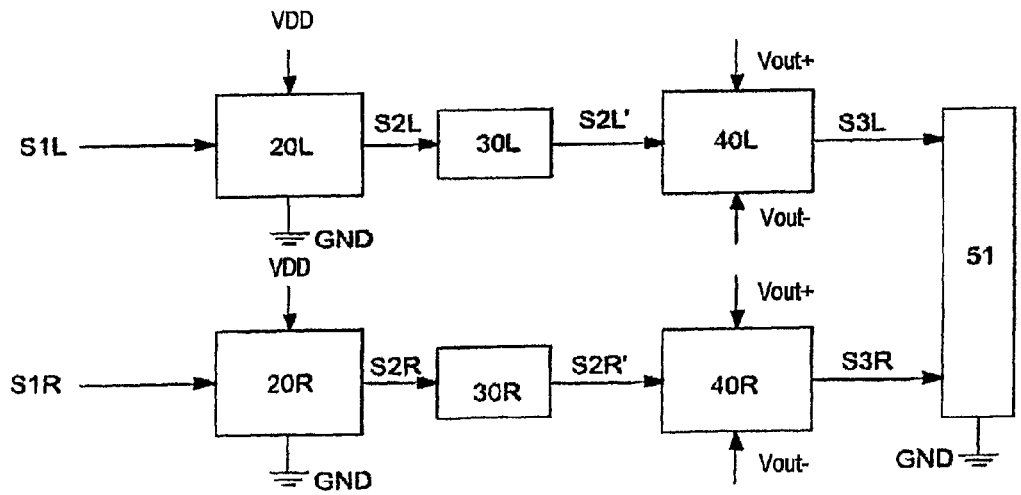

FIG. 24 illustrates a more specific application of the arrangement of FIG. 23: the charge pump 100/2100, and its supply connections have been omitted for clarity. The application in this example is a stereo amplifier in which the load is a stereo headphone 51. The signal processing elements of the amplifier are duplicated to process left and right channel signal, as indicated by the suffixes 'L' and 'R' on their reference signs. The supply voltages Vout+& Vout− can be shared by both channels, although independent supplies for different channels would be possible if the application demands it. One area of application is in portable audio apparatus such as MP3 players for example where the split rail supply allows a DC-coupled output, which is desirable to maintain the bass response without having to use large decoupling capacitors.

The mode of operation of charge pump 400, 900, is determined by a control signal (not shown). Mode 1 may be used to drive a low impedance load such as headphones, while Made 2 is used only to drive a high impedance load such as a line output. In other cases, Modes 1 and 2 may be used for headphone driving, with Mode 1 being used when volume levels are low and the audio output signal is not wanted to exceed +/−VDD/2. Mode selection may be carried out manually such as by a volume setting level or code, for example, or alternatively by automatically sensing the output impedance or output current supply or simply sensing jack socket versus docking station operation in the case of a portable audio device.

In the case of using the volume control to "Mode select", setting the charge pump to Mode 2 should the volume be set high will under normal circumstances cause the output supply voltages to collapse due to the fact that the load's power requirements are greater than that which the charge pump 400, 900, has been designed for. Nevertheless, safeguards (for example, to protect against ear damage as a result of dangerously high volumes), in the form of extra circuitry (not illustrated), can be put in place to monitor for such a situation so as to disable the charge pump 400, 900, or another part(s) of the circuitry.

Figure 25A:
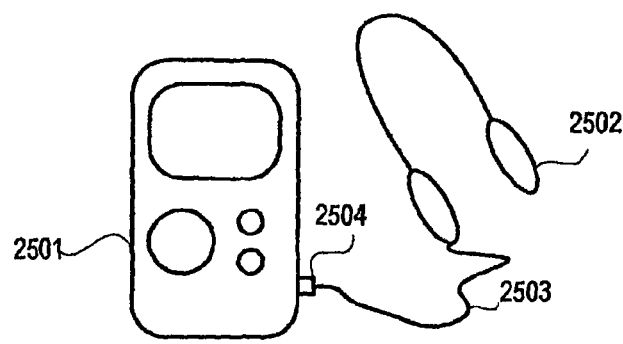
FIGS. 25a to 25c show a portable audio apparatus incorporating the amplifier circuit of FIG. 24 in different modes of operation.
Figure 25B:
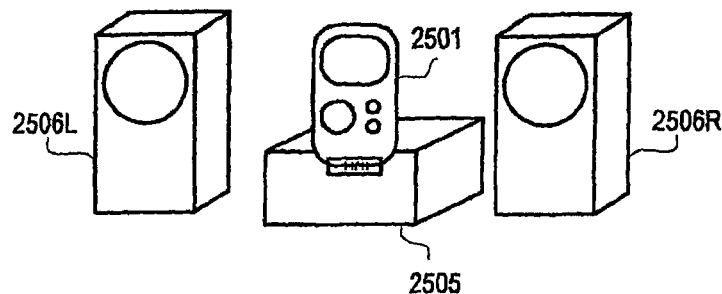

FIGS. 25a and 25b show a portable electronic apparatus being used in two arrangements, whereby any of the DMCP embodiments above could be applied advantageously to provide power to the output stage at appropriate levels for each arrangement.

FIG. 25a shows a portable electronic audio apparatus 1 in the first arrangement, connected to drive a pair of headphones 2. Apparatus 1 in the illustration is, an MP3 player, but the same functions may be integrated into phones and multimedia players, laptop computers, PDAs and the like. Headphones 2 are connected to the apparatus via a lead 3 plugged into output jack 4. The body of the apparatus may also include one or more miniature loudspeakers (not shown), which can be driven as an alternative audio output transducer, but are in principle equivalent to the headphones for the purpose of this description. As is well known, small size and weight, together with maximum battery life, are key attributes of premium products in this market. Manufacturing cost is an important factor across the market.

Figure 25C:
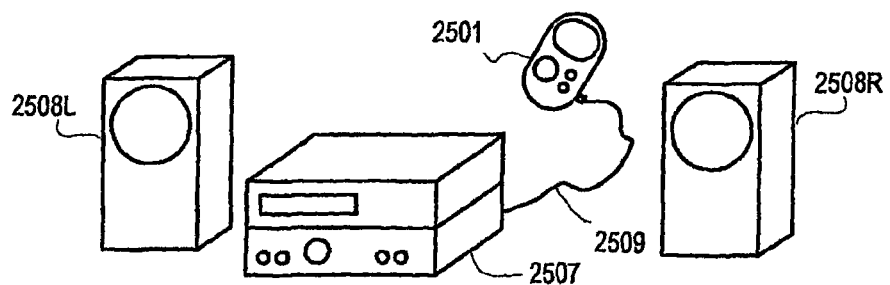

FIG. 25b shows the same apparatus 1 in a second arrangement, where no headphones are connected. Instead, the apparatus is connected via a separate connector to a docking station 5, which in turn drives larger loudspeakers 6L, 6R. Docking station 5 incorporates a higher powered amplifier than the portable device itself, and a separate power supply, usually mains-powered. FIG. 25c shows the same apparatus in a variation of the second arrangement, in which an external amplifier 7 and loudspeakers 8L, 8R are connected via a line lead 9 plugged into the headphone jack 4 in place of the headphones.

The apparatus 1 is required to drive very different loads in these arrangements. A headphone or loudspeaker will typically have an impedance of 32 ohms or less. Into this load, an output amplitude of, say 100 mV RMS will provide a moderate volume, (say −12 dB from full scale), corresponding to a full scale output power 30 mW. When driving the line input of a larger amplifier in the second arrangement, the load impedance is typically 10 kilohms or more, and a full scale signal amplitude (0 dB) of 2V RMS is appropriate for maximum quality. If the output stage driving the socket in the first arrangement is capable of providing a 2V RMS signal, its supply voltage must be greater than 2V. When driving a headphone load in arrangement 1 from the same output stage, most of the output stage power consumption is dissipated in the form of heat, as the supply voltage is dropped to the 100 mV level in the transistors of the output stage. If, to increase battery life, the designer opts not to provide the full 2V RMS for line output situations, a poorer signal is the result.

As a result of these competing requirements, premium products in this market have conventionally adopted the practice of providing separate output stages, one used for driving headphone/speaker loads 2, and another for line out situations via the docking connector 4. Each output stage can be driven from a power supply appropriate to the voltage range, maintaining power efficiency and quality in each application. Needless to say, the requirement for separate output stages and separate power supplies for them increases the size and cost of the apparatus undesirably.

The DMCP can be incorporated in such an apparatus 1, thereby dispensing with the need for separate output stages. Instead a single output stage may be provided, with the DMCP used as its power supply. In this embodiment, the DMCP can be arranged to operate in Mode 1, when the apparatus is driving a headphone load and in Mode 2 when driving a further amplifier through line out.

Ideally the DMCP can be made to operate in the appropriate mode automatically, depending on the apparatus arrangement. In the case where a docking connector, separate from headphone jack 4, is used the second arrangement (FIG. 25b), the DMCP's control circuit can decide directly which mode should apply, from a general signal indicating docked status. Where the same jack 4 is used in the second arrangement as in the first arrangement, mode selection may be determined in several ways. As a first option, a switch or menu option may be available to the user to select explicitly between sound and line output modes. The user setting may alternatively be implicit in the act of turning the volume control to full scale, on the assumption that headphones will not be used at the maximum level in practice. Alternatively it may be possible to sense the type of load by automatically sensing the output impedance or output current supply or even jack socket versus docking station operation in the case of a portable audio device.

Other possible application areas where the ability to generate a split rail supply include: (1) voltage supplies for circuits handling analogue composite video signals, where a ground-referenced DC-coupled output signal can avoid black-level droop; and (2) line drivers for data links or modems such as ADSL where a ground-referenced DC-coupled output signal can reduce baseline wander effects.

For cost and size reasons, it is important to be able to integrate the functions of an MP3 player, mobile phone or any other application into a small number of integrated circuits. Therefore it is advantageous to integrate the circuitry for supply voltage generation, in this case the charge pump 400, 900, together with the functional circuitry 20, 30, 40 etc. Generally speaking, the charge pump 400, 900, includes a capacitor which cannot realistically be integrated and has to be located off-chip, with consequences for chip-pin-count and overall circuit size. Since many circuits require supplies of dual polarity (split rail supplies), this has prompted the development of voltage generation circuits that are capable of generating two (or more) output voltage supplies using a single capacitor, rather than a capacitor per required output voltage.

Many other modifications in the control scheme, the form of the controller and even specifics of the switch network may be varied. The skilled reader will appreciate that the above and other modifications and additions are possible to these circuits, without departing from the spirit and scope of the invention as defined in the appended claims. Accordingly, the above described embodiments are presented to illustrate rather than limit the scope of the invention. For interpreting this specification and claims, the reader should note that the word "comprising" does not exclude the presence of elements or steps other than those listed in a claim, the singular article "a" or "an" does not exclude a plurality (unless the context requires otherwise), and a single element may fulfil the functions of several elements recited in the claims. Any reference signs in the claims shall not be construed so as to limit their scope.

Where a claim recites that elements are "connected" or are "for connecting", this is not to be interpreted as requiring direct connection to the exclusion of any other element, but rather connection sufficient to enable those elements to function as described. The skilled reader will appreciate that a good, practical design might include many auxiliary components not mentioned here, performing, for example, start-up and shutdown functions, sensing functions, fault protection or the like, some of which have been mentioned already, and none of which detract from the basic functions characteristic of the invention in its various embodiments described above in the claims.

Labels Vout+, Vout− and VDD etc. are to be interpreted in throughout the above description to refer to either the respective terminals or the voltage at that terminal, according to context.

In addition to variations and modifications within the charge pump circuit itself, the invention encompasses all manner of apparatuses and systems incorporating the charge pump, besides the headphone amplifier application illustrated in FIG. 24. The circuit may be used to power output stages of all manner of apparatus, including communications apparatus, where the output stage may drive an antenna or transmission line, an electro-optical transducer (light emitting device) or an electromechanical transducer.

The invention claimed is:

1. A charge pump circuit having terminals for connection to an input voltage supply, first and second reservoir capacitors, a flying capacitor and a switch array interconnecting said terminals, the circuit being operable, in use, in an equalization mode to repeatedly alternate said flying capacitor between a connection to said first reservoir capacitor and a connection to said second reservoir capacitor without connecting the flying capacitor to the input voltage supply, the circuit being further operable, in use, in at least:
a first voltage generating mode to generate first output voltages on said first and second reservoir capacitors; and
a second voltage generating mode to generate second output voltages on said first and second reservoir capacitors,
wherein the first output voltages are lower in magnitude than the second output voltages.

2. A charge pump circuit as claimed in claim 1 wherein said circuit is configured to transition from said second voltage generating mode to said equalization mode in response to an indication that a lower output voltage is required.

3. A charge pump circuit as claimed in claim 1 wherein said circuit is configured to operate in said equalization mode to provide a transition from said second voltage generating mode to said first voltage generating mode.

4. A charge pump circuit as claimed in claim 3 wherein the circuit is configured to monitor the voltage on one or both of the first and second reservoir capacitors in the equalization mode and to transition from the equalization mode to the first voltage generating mode when said monitored voltage reaches a threshold.

5. A charge pump circuit as claimed in claim 3 wherein the circuit is configured to transition from said second voltage generating mode to said equalization mode and wait for the output voltages to drop before transitioning to said first voltage generating mode.

6. A charge pump circuit as claimed in claim 1 wherein, in use, said first voltage generating mode comprises controlling said switch array to connect said terminals in three states of operation wherein:
a first state of said first voltage generating mode is a state in which said flying capacitor and first reservoir capacitor are connected in series with one another and in parallel with the input supply voltage;
a second state of said first voltage generating mode is a state in which said flying capacitor is connected in parallel with the second reservoir capacitor; and
a third state of said first voltage generating mode is a state in which said flying capacitor is connected in parallel with the first reservoir capacitor.

7. A charge pump circuit as claimed in claim 6 wherein the equalization mode comprises controlling said switch array to connect said terminals in at least two states of operation in use, said at least two states comprising states which are the same as said second state and said third state of the first voltage generating mode.

8. A charge pump circuit as claimed in claim 7 wherein said equalization mode comprises a further state of operation wherein said switch array does not connect any of said terminals.

9. A charge pump circuit as claimed in claim 1 wherein, in use, said second voltage generating mode comprises controlling said switch array to connect said terminals in two states of operation wherein:
a first state of said second voltage generating mode is a state in which said flying capacitor and first reservoir capacitor are connected in parallel with one another and in parallel with the input supply voltage;
a second state of said second voltage generating mode is a state in which said flying capacitor is connected in parallel with the second reservoir capacitor.

10. A charge pump circuit as claimed in claim 1 wherein, on transition from the first voltage generating mode to the second voltage generating mode, the charge pump circuit is configured to implement current limiting.

11. A charge pump circuit as claimed in claim 1 wherein the first output voltages are positive and negative output voltages each substantially equal in magnitude to half the magnitude of the input voltage.

12. A charge pump circuit as claimed in claim 1 wherein the second output voltages are positive and negative output voltages each substantially equal in magnitude to the magnitude of the input voltage.

13. A charge pump circuit as claimed in claim 1 wherein the charge pump comprises inputs for a plurality of different input supply voltages.

14. A charge pump circuit as claimed in claim 1 wherein the switch array comprises:
- a first switch connected between the input voltage supply terminal and a first flying capacitor terminal;
- a second switch connected between the first flying capacitor terminal and the first reservoir capacitor terminal,
- a third switch connected between the first flying capacitor terminal and a common voltage terminal;
- a fourth switch connected between a second flying capacitor terminal and the first reservoir capacitor terminal;
- a fifth switch connected between the second flying capacitor terminal and the common voltage terminal; and
- a sixth switch between the second flying capacitor terminal and the second reservoir capacitor terminal;
- wherein the first and second flying capacitor terminals are in use connected to opposite ends of the same flying capacitor.

15. A charge pump circuit as claimed in claim 14 further comprising a seventh switch connected between the input voltage supply terminal and the first reservoir capacitor terminal.

16. A charge pump circuit as claimed in claim 14 wherein at least one of said switches comprises a plurality of switch elements in parallel.

17. A charge pump circuit as claimed in claim 1 comprising flying capacitor terminals for connection to more than one flying capacitor.

18. A charge pump circuit as claimed in claim 1 comprising a flying capacitor and first and second reservoir capacitors connected to respective ones of said terminals.

19. An amplifier circuit comprising a charge pump circuit as claimed in claim 1 and an audio output stage, the output stage being supplied with the output voltages produced by the charge pump.

20. An amplifier circuit as claimed in claim 19 comprising a mode select circuit for selecting a mode of operation of the charge pump circuit based on an indication of the signal level of the output stage.

21. An electronic apparatus comprising a charge pump circuit as claimed in claim 1.

22. An electronic apparatus as claimed in claim 21 wherein the apparatus is at least one of: a portable apparatus; a battery powered apparatus; an audio apparatus; a multimedia player; a communications device; a mobile telephone; a computing apparatus; or a personal data assistant.

23. A charge pump comprising:
- a switch array which is interposed among first and second output capacitors, a flying capacitor, and an input power supply; and
- a controller which controls the switch array, wherein
- the charge pump is operable in an operation mode including a high-voltage outputting mode, a low-voltage outputting mode, and an equalization mode, and
- the controller controls the switch array so that:
  - in the high-voltage outputting mode, the first and second output capacitors respectively output first positive and negative voltages;
  - in the low-voltage outputting mode, the first and second output capacitors respectively output second positive and negative voltages lower than the first positive and negative voltages; and
  - in the equalization mode, respective charging voltages of the first and second capacitors that are charged in the high-voltage outputting mode are gradually lowered, and
- the controller changes the operation mode of the charge pump by direct transition from the low-voltage outputting mode to the high-voltage outputting mode when a voltage raise command is given during a period when the operation mode of the charge pump is in the low-voltage outputting mode, and
- the controller changes the operation mode of the charge pump by transition from the high-voltage outputting mode through the equalization mode to the low-voltage outputting mode when a voltage lower command is given during a period when the operation mode of the charge pump is in the high-voltage outputting mode.

24. The charge pump according to claim 23, wherein the controller causes, in the equalization mode, the switch array to repeatedly perform:
- a first equalization phase in which the input power supply is disconnected from the first and second output capacitors and the flying capacitor, and the flying capacitor and the first output capacitor are connected in parallel; and
- a second equalization phase in which the flying capacitor is disconnected from the first output capacitor, and connected in parallel to the second output capacitor.

25. The charge pump according to claim 23, wherein the controller causes, in the high-voltage outputting mode, the switch array to repeatedly perform:
- a first high-voltage mode charging phase in which an output voltage of the input power supply is applied to the flying capacitor and the first output capacitor; and
- a second high voltage mode phase in which the flying capacitor is disconnected from the first output capacitor, and connected in parallel to the second output capacitor, thereby causing the first and second output capacitors to output the first positive and negative voltages, respectively, and
- the controller causes, in the low-voltage outputting mode, the switching circuit to repeatedly perform:
- a first low voltage mode charging phase in which the flying capacitor and the first output capacitor are connected in series, and the output voltage of the input power supply is applied to the flying capacitor and the first output capacitor that are connected in series;
- a second low voltage mode phase in which the flying capacitor and the first output capacitor are connected in parallel; and
- a third low voltage mode phase in which the flying capacitor is disconnected from the first output capacitor, and connected in parallel to the second output capacitor, thereby causing the first and second output capacitors to output the second positive and negative voltages.

26. The charge pump according to claim 23, wherein, when the voltage lower command is given during the period when the operation mode is in the high-voltage outputting mode, the controller causes the operation mode to transition from the high-voltage outputting mode to the equalization mode, and when a charging voltage of at least one of the first output capacitor and the second output capacitor, is lowered to a threshold or lower, causes the operation mode of the charge pump to transition from the equalization mode to the low-voltage outputting mode.

27. The charge pump according to claim 23, wherein charging voltages of the first and second output capacitors and the flying capacitor are gradually lowered while their levels are equalized to each other in the equalization mode.

28. The charge pump according to claim 26, wherein the threshold is an arbitrary value that is based on output voltage of the input power supply and is set such that unwanted current does not flow through the transistors in the switch array.

29. The charge pump according to claim 26, wherein the threshold is substantially 0.5.HPVDD where HPVDD indicates the output voltage of the input power supply.

30. The charge pump according to claim 23 wherein, on transition from the low-voltage outputting mode to the high-voltage outputting mode in response to a voltage raise command given during a period when the operation mode of the charge pump is in the low-voltage outputting mode, the charge pump circuit is configured to limit the current that can flow through at least one switch of the switch network for a period of time.

31. A charge pump circuit having terminals adapted for connection to an input voltage supply, first and second reservoir capacitors and at least one flying capacitor, the circuit being operable, in use, in a mode where said at least one flying capacitor is connected in a sequence of states such that the voltages on the first and second reservoir capacitors gradually lower and remain substantially balanced.

32. A charge pump circuit as claimed in claim 31 wherein the sequence of states includes states where the charge pump is separately connected to said first reservoir capacitor and said second reservoir capacitor.

33. A charge pump circuit for producing positive and negative output voltages operable, in use, in:
- a first mode to produce positive and negative output voltages of a first magnitude,
- a second mode to produce positive and negative output voltages of a second magnitude, the first magnitude being lower than the second magnitude; and
- a third mode to allow the output voltages to reduce from the second magnitude towards the first magnitude whilst ensuring the positive and negative voltages remain substantially balanced.

\* \* \* \* \*